March 22, 1955 J. WICKS 2,704,788

TOLL TELEPHONE CALL DISTRIBUTING SYSTEM

Filed March 22, 1952 9 Sheets-Sheet 1

INVENTOR.
John Wicks
BY
Smith, Olsen & Baird
Attys.

TOLL TELEPHONE CALL DISTRIBUTING SYSTEM

Filed March 22, 1952

9 Sheets-Sheet 2

INVENTOR.
John Wicks
BY
Smith, Olsen & Baird
Attys.

INVENTOR.
John Wicks
BY
Smith, Olsen & Baird
Attys.

March 22, 1955 J. WICKS 2,704,788

TOLL TELEPHONE CALL DISTRIBUTING SYSTEM

Filed March 22, 1952 9 Sheets-Sheet 4

INVENTOR.
John Wicks

BY

Smith, Olsen + Baird

Attys.

INVENTOR.
John Wicks
BY
Smith, Olsen & Baird
Attys.

INVENTOR.
John Wicks
BY
Smith, Olsen & Baird
Attys.

March 22, 1955 J. WICKS 2,704,788

TOLL TELEPHONE CALL DISTRIBUTING SYSTEM

Filed March 22, 1952 9 Sheets-Sheet 7

INVENTOR.
John Wicks

BY
Smith, Olsen & Baird
Attys.

INVENTOR.
John Wicks
BY
Smith, Olsen & Baird
Attys.

INVENTOR.
John Wicks

BY
Smith, Olsen + Baird
Attys.

United States Patent Office 2,704,788

Patented Mar. 22, 1955

2,704,788

TOLL TELEPHONE CALL DISTRIBUTING SYSTEM

John Wicks, Biloxi, Miss., assignor to Automatic Electric Laboratories, Inc., Chicago, Ill., a corporation of Delaware

Application March 22, 1952, Serial No. 277,951

31 Claims. (Cl. 179—27)

Figures 1A, 1B, 1C, 9:
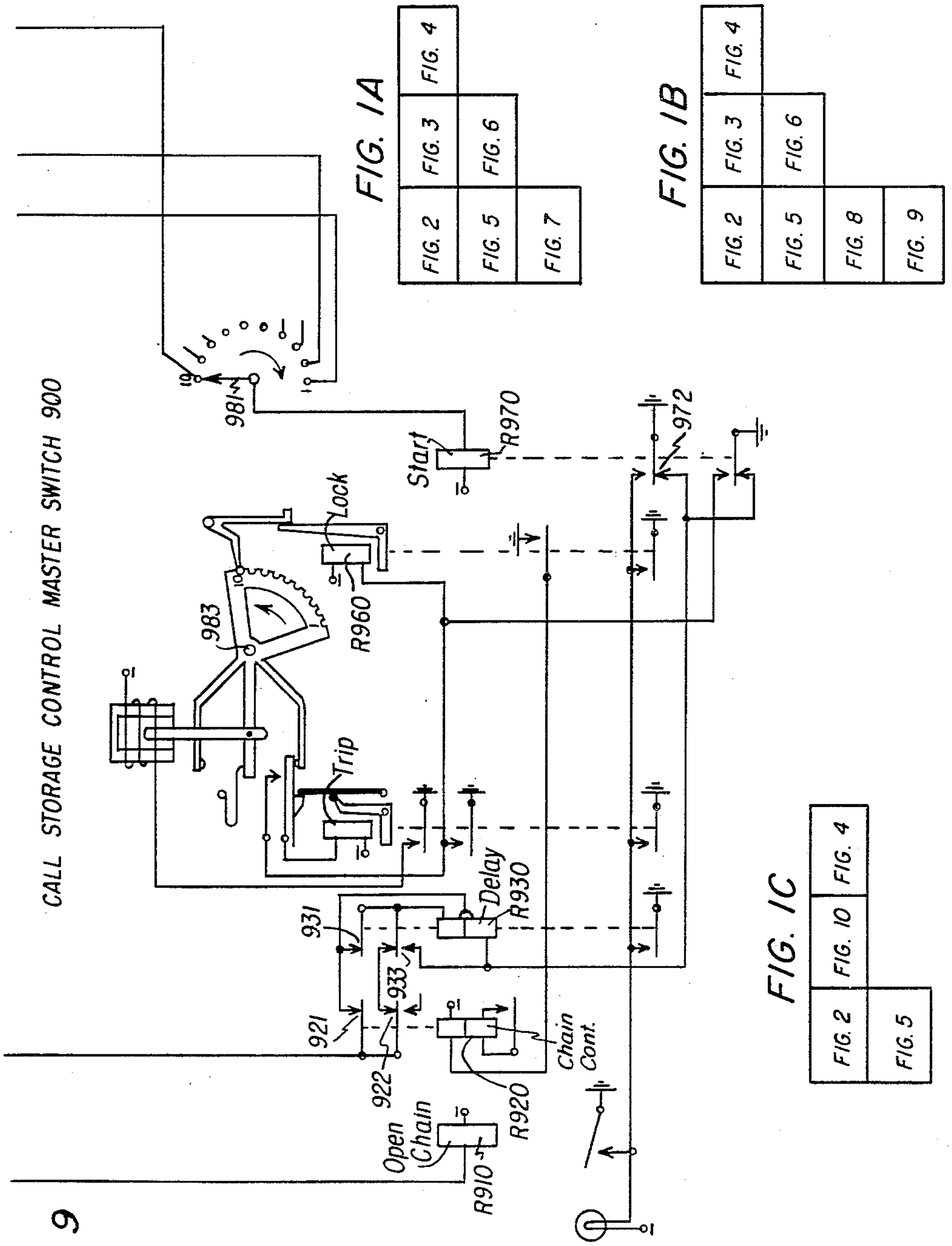

The present invention relates to telephone systems in general and, more particularly, to improvements in automatic switching apparatus provided in conjunction with toll switchboards for the purpose of distributing incoming toll calls to the links at the operator position of the switchboard.

In toll switching systems of the type disclosed in the Thomas F. Crocker Patent No. 2,167,710, granted August 1, 1939, and in the Imre Molnar Patent No. 2,361,313, granted October 24, 1944, each operator position at a toll switchboard is provided with a plurality of links. Each link includes a vertical rotary type finder switch for finding and connecting with inward, ring-down, or CLR calling trunk circuits and for connecting the same to the operator position so that the call thereon may be answered. Each link also includes a vertical-rotary type selector switch which is controllable from the operator position by means of the usual key sender to extend the toll call to the desired destination. In addition, systems of the type noted are normally provided with position distributor equipment and in some cases link distributor equipment for the purpose of determining the particular position of the switchboard that is to receive the call and to select an idle link thereat that is to be utilized in answering a particular call. In the toll switching system of the type disclosed in the Harvey W. Balzer application Serial No. 181,508, filed August 25, 1950, now Pat. No. 2,697,134, each of the toll trunk circuits, including the inward, ring-down, and CLR toll trunk circuits, is provided with a rotary type hunting switch which is controllable from the operator position by means of appropriate distributors to distribute incoming calls to appropriate operator links. In the toll switching system of the character disclosed in the above noted Balzer application, the rotary switches are individually associated with the trunk circuits and they search for idle links at the operator positions. Consequently, the vertical-rotary type line finders utilized in the links of the systems disclosed in the above noted Crocker and Molnar patents are no longer required and the links are found by the stepping action of the trunk circuit rotary switches. While the above described facilities for distributing toll calls to idle links at the different operator positions of a toll switchboard are satisfactory and provide high speed distribution of toll calls, it has been found that the initial installation cost of such systems is relatively high.

Accordingly, it is the main object of the present invention to provide a call distributing arrangement in a toll switching system which is inexpensive to manufacture and install and which will automatically route toll calls to idle links at the operator positions of the switchboard.

It is still another object of the invention to provide a call distributing arrangement between the incoming toll trunk circuits and the links at the toll operator positions which comprises a plurality of plunger type switches.

It is a further object of the invention to provide a call distributing arrangement in a toll switching system of the character noted which comprises a plurality of plunger type primary switches and either a plurality of plunger type secondary switches or a plurality of rotary type secondary switches.

It is a still further object of the invention to provide in a call distributing arrangement of the character noted, improved apparatus for temporarily storing incoming toll calls in the event that they can not be immediately distributed to the links at the operator position and for distributing such stored calls, either in the order that the calls are stored or at random, to the links at the operator position as soon as they become available.

It is still another object of the invention to provide in a call distributing arrangement of the character noted improved call storing apparatus which includes plunger type switches and rotary type switches.

Further objects of the present invention pertain to the particular arrangement of the apparatus and the circuit elements of the call distributing and call storage facilities whereby the above outlined and additional operating features are attained.

The invention, both as to its organization and method of operation, together with further objects and advantages thereof, will best be understood by reference to the specification taken in connection with the accompanying drawings, in which Fig. 1A illustrates the mode of combining Figs. 2 to 7, inclusive, to form the preferred embodiment of the system; Fig. 1B illustrates the mode of combining Figs. 2 to 6, inclusive, and Figs. 8 and 9 to form a modified system; and Fig. 1C illustrates the mode of combining Figs. 2, 4, 5, and 10 to form still another modified system.

When Figs. 2 to 7, inclusive, are assembled together in the manner illustrated in Fig. 1A, they disclose the preferred call distributing arrangement, together with call storage facilities whereby incoming toll calls may be distributed to links at the operator positions or whereby the calls may be temporarily stored if the links are busy at the time the calls are received.

Figure 2:
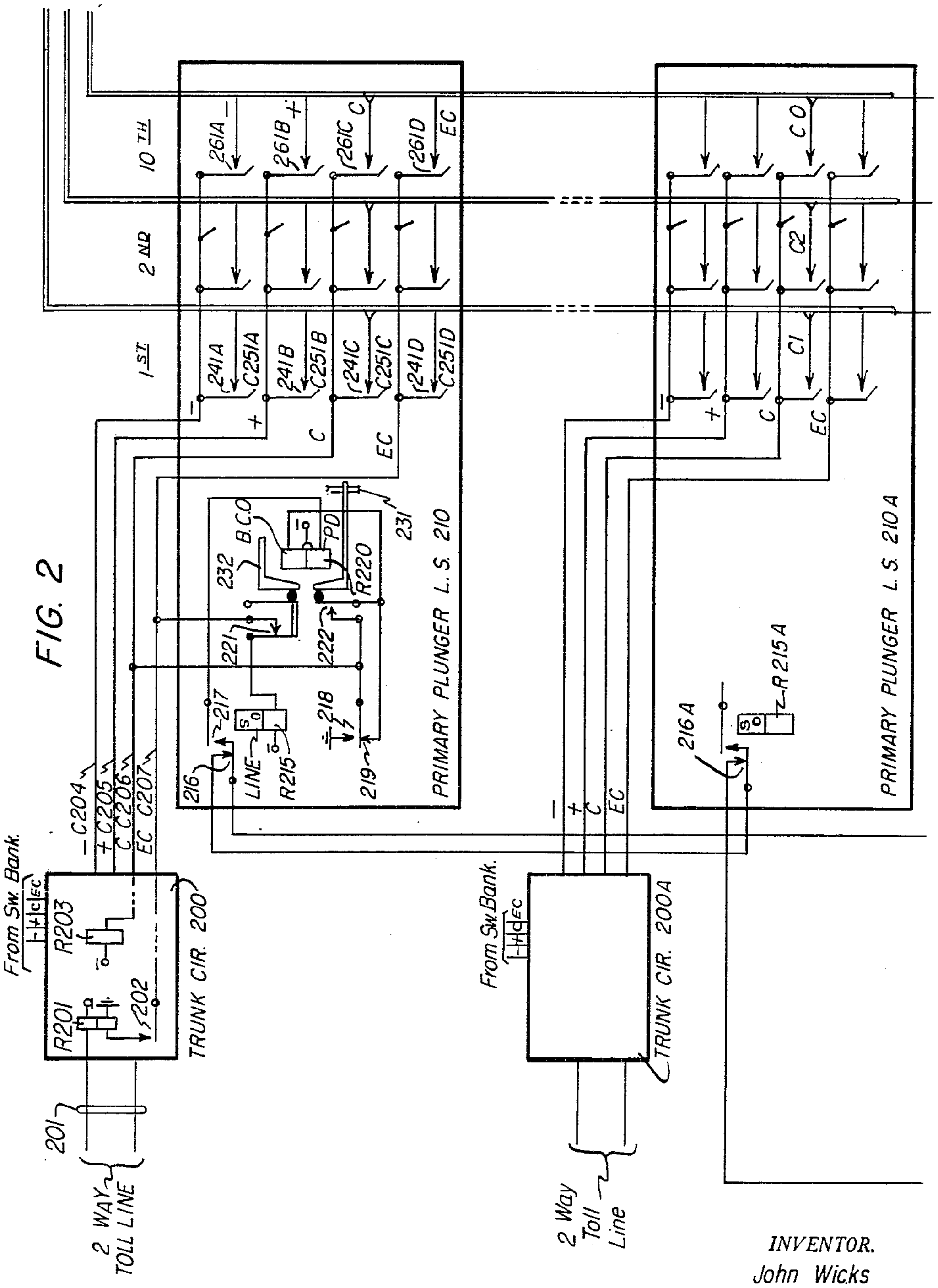

Referring now more particularly to Figs. 2 to 7, inclusive, of the drawings, there is illustrated in Fig. 2, a toll trunk circuit 200 terminating an incoming toll line 201. The toll trunk circuit 200 may, for example, be either an inward, ring-down or CLR trunk crcuit of the type illustrated in the above noted Crocker and Molnar patents and in the above noted Balzer application, and modified to control the operation of the call distributing apparatus over the EC conductor instead of over the negative and positive talking conductors. Individually associated with the incoming trunk circuit 200 there is provided a plunger type primary line switch 210 of the type disclosed in "Telephone Theory and Practice" by Kempster B. Miller, first edition published by M. C. McGraw-Hill Book Company, Inc., New York, 1933, beginning at page 32 thereof, but modified for EC operation.

Figure 3:
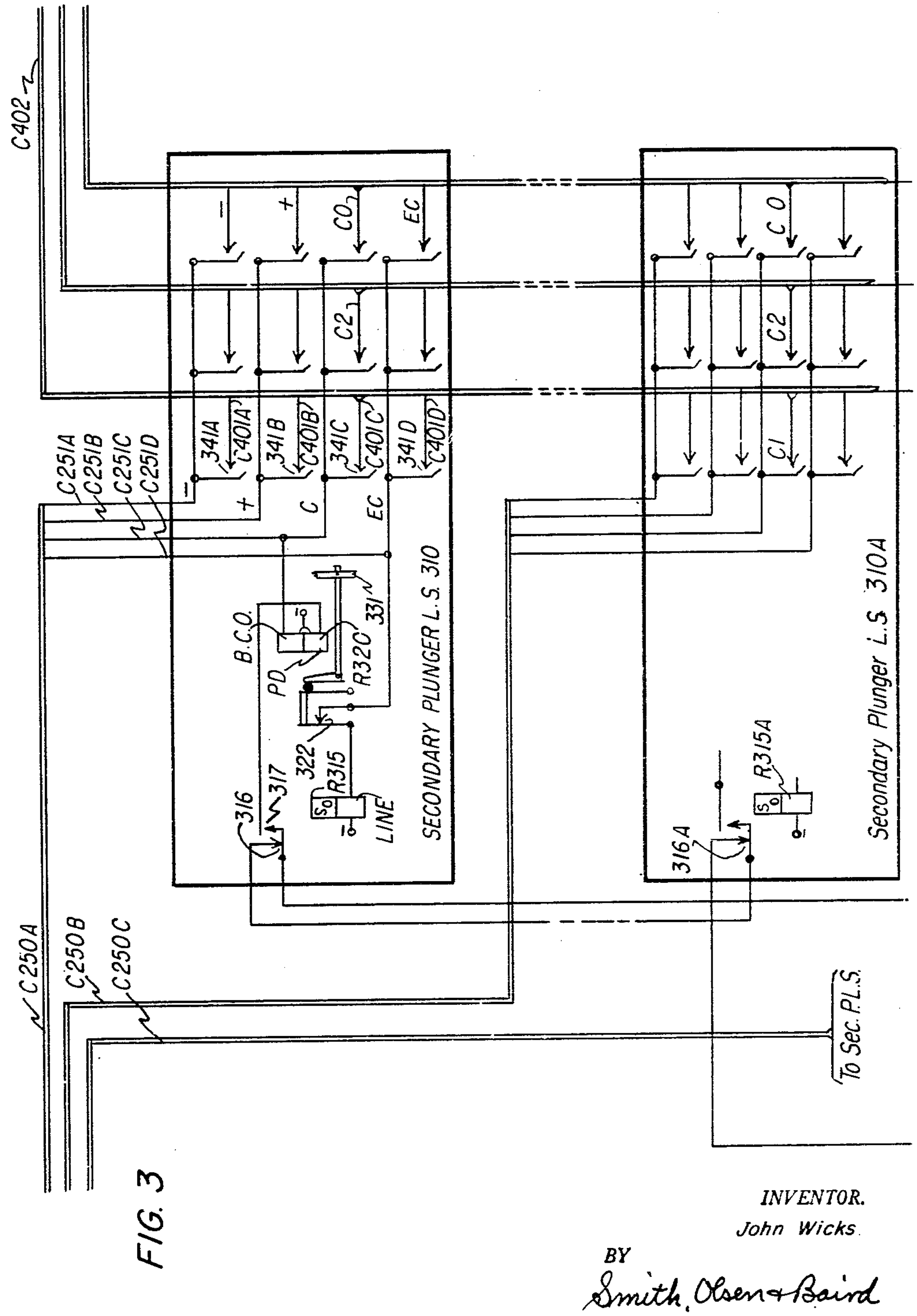
Figure 4:
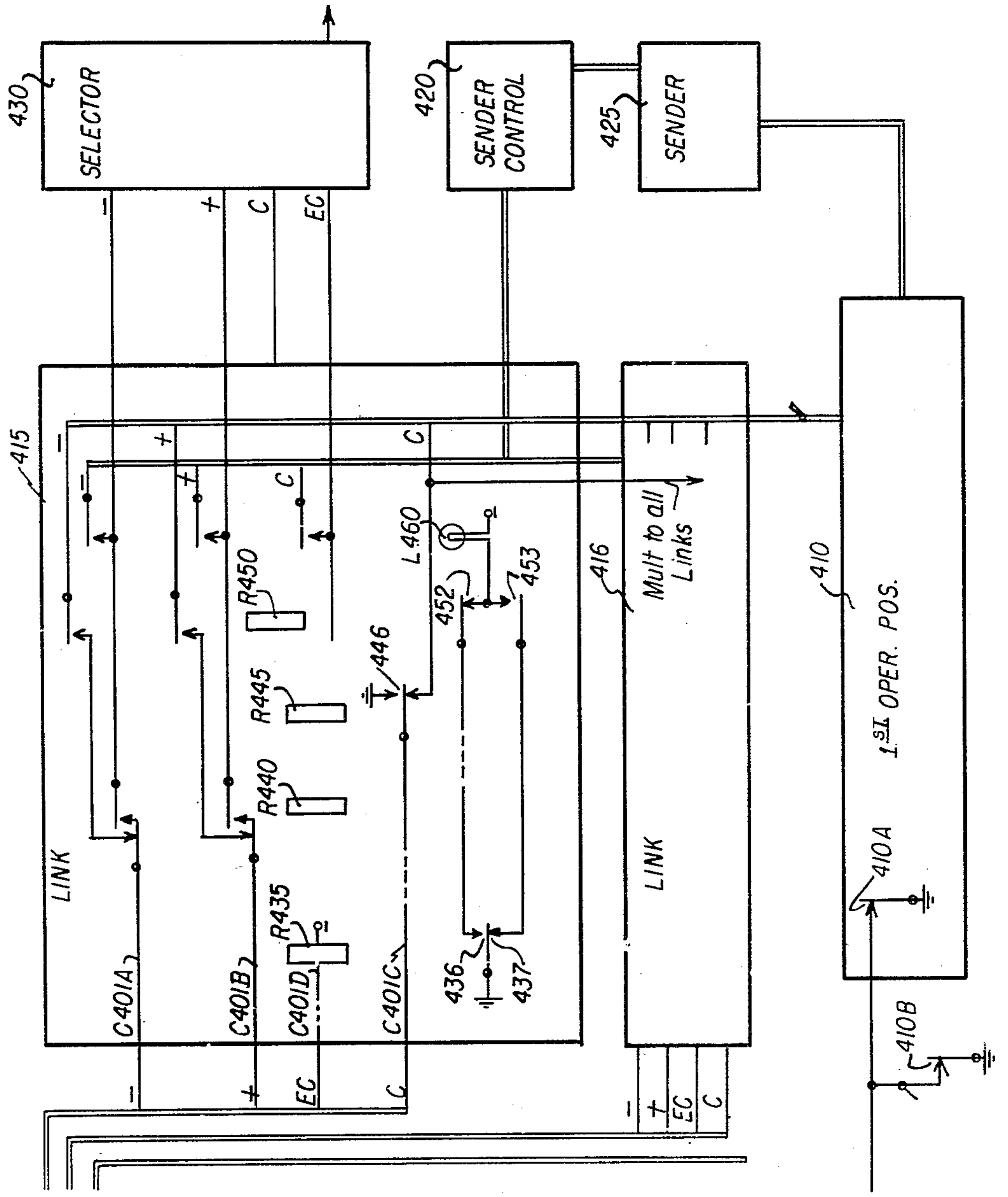

Fig. 3 discloses a plunger type secondary line switch 310 which is accessible to the primary switches, such as 210, and which has access to idle links at the different operator positions of the toll switchboard schematically illustrated at Fig. 4.

Fig. 4 discloses a first operator position 410 and a plurality of links thereat including the links 415 and 416. The sender control circuit 420 and the sender 425 is associated with the first operator position 410 and may be controlled by the usual sender keys (not shown) at the position to transmit switch controlling impulses in order to control automatic switching apparatus to set up a desired connection to a called destination. The selector 430 is connected directly to the link 415 for the purpose of extending toll connections received at the link 415 to a call destination under control of the sender 425 in a conventional manner. It should be understood that the link 416 is also provided with an individual selector (not shown), such as the selector 430, for completing toll connections.

Figure 5:
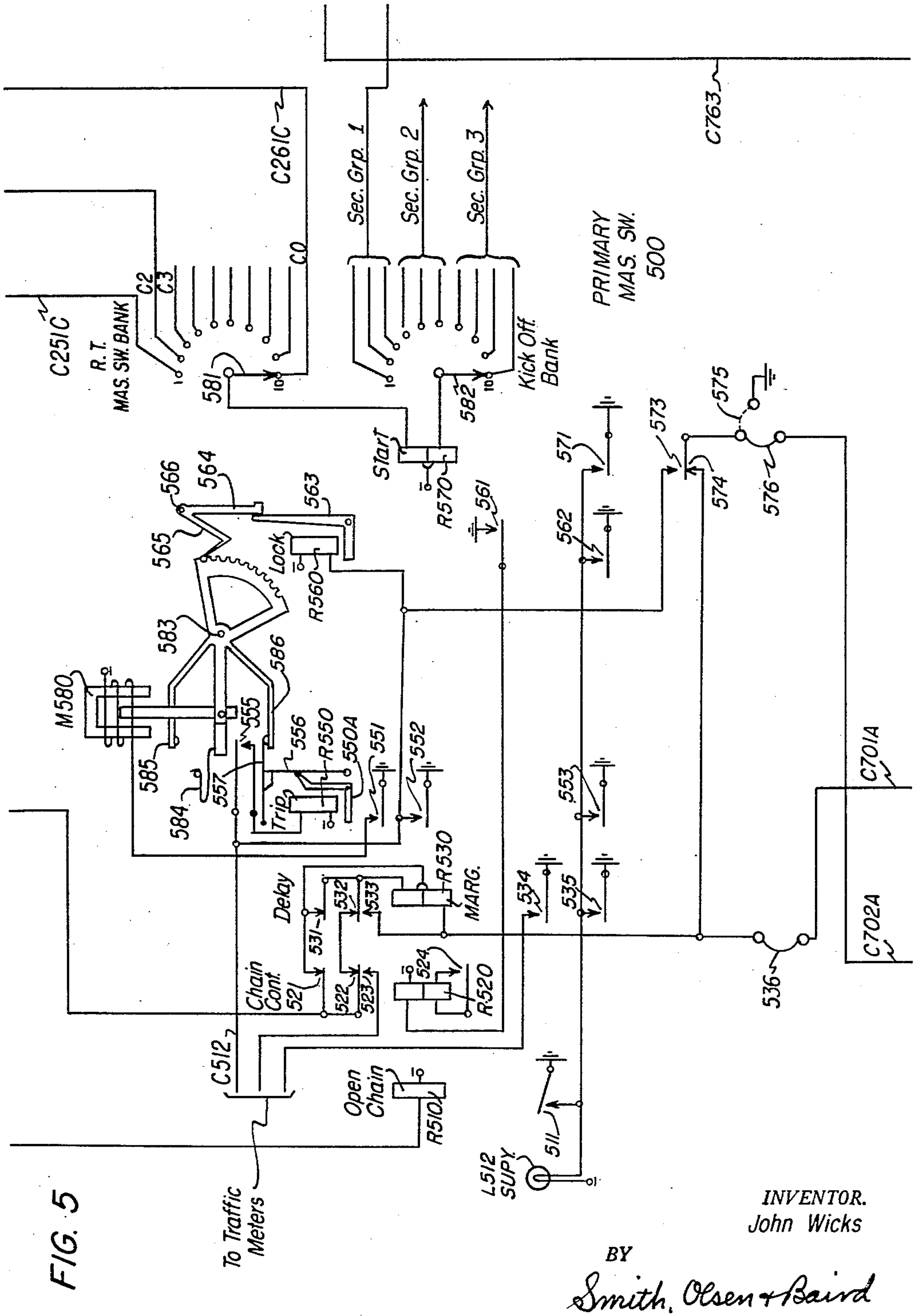
Figure 6:
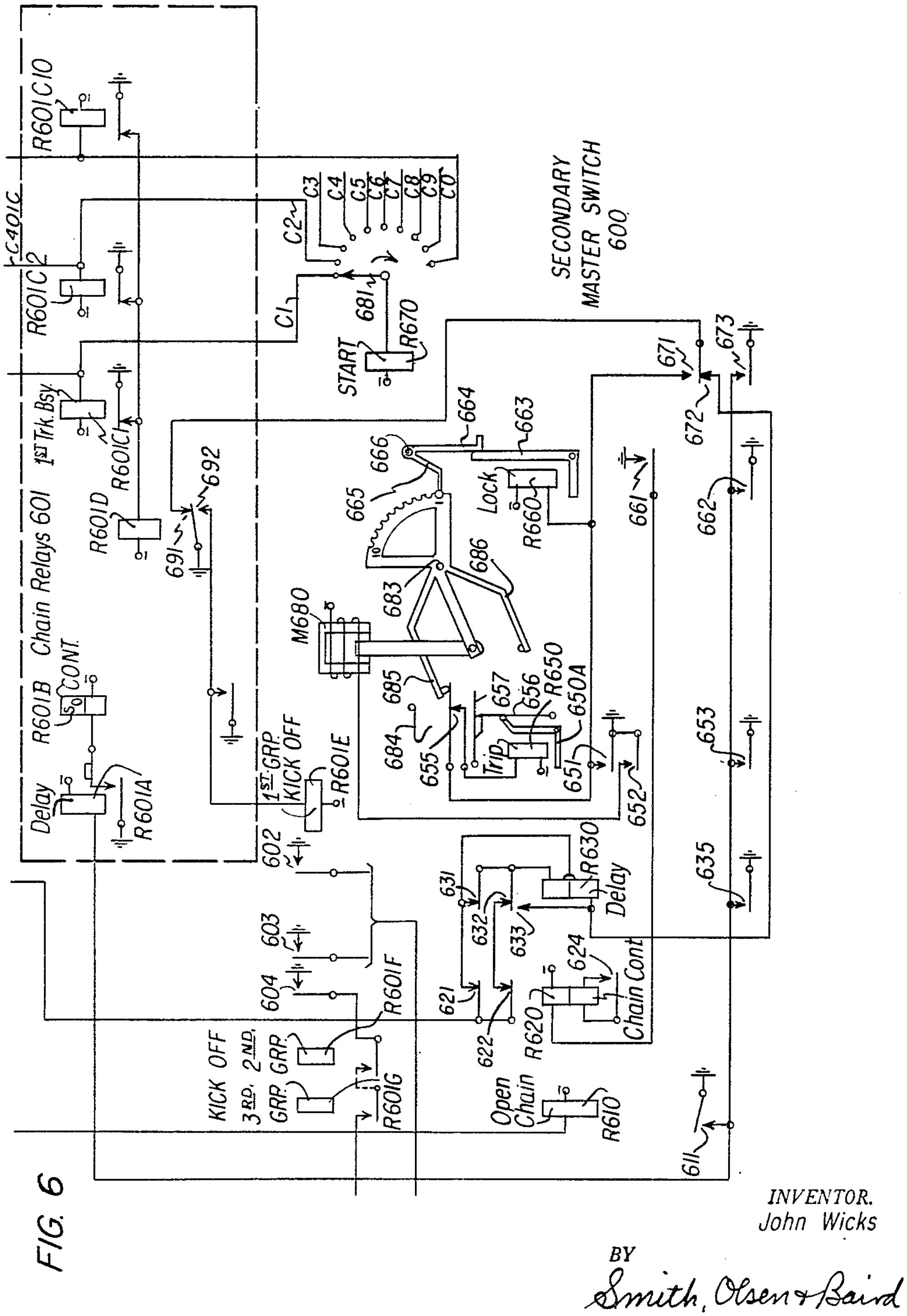

Figs. 5 and 6 respectively, show the details of the primary master switch 500 and the secondary master switch 600. The above noted master switches are substantially the same as the master switch illustrated and described beginning at page 39 of the above noted Miller publication. These switches normally control the plunger arms of the plunger type line switches 210, 310, etc., so that they are maintained opposite an idle available trunk extending to the next switching stage. Thus, the master switch 500 controls all of the line switches, including the line switch 210, of a group so that the plunger arms thereof, when actuated in response to a call, will always select an idle trunk line extending to the next switching stage. The same control is performed by the secondary master switch 600 so that any secondary line switch in a group, including the line switch 310, will always select an idle link at an operator position when the plunger arm of a line switch is actuated.

Figure 7:
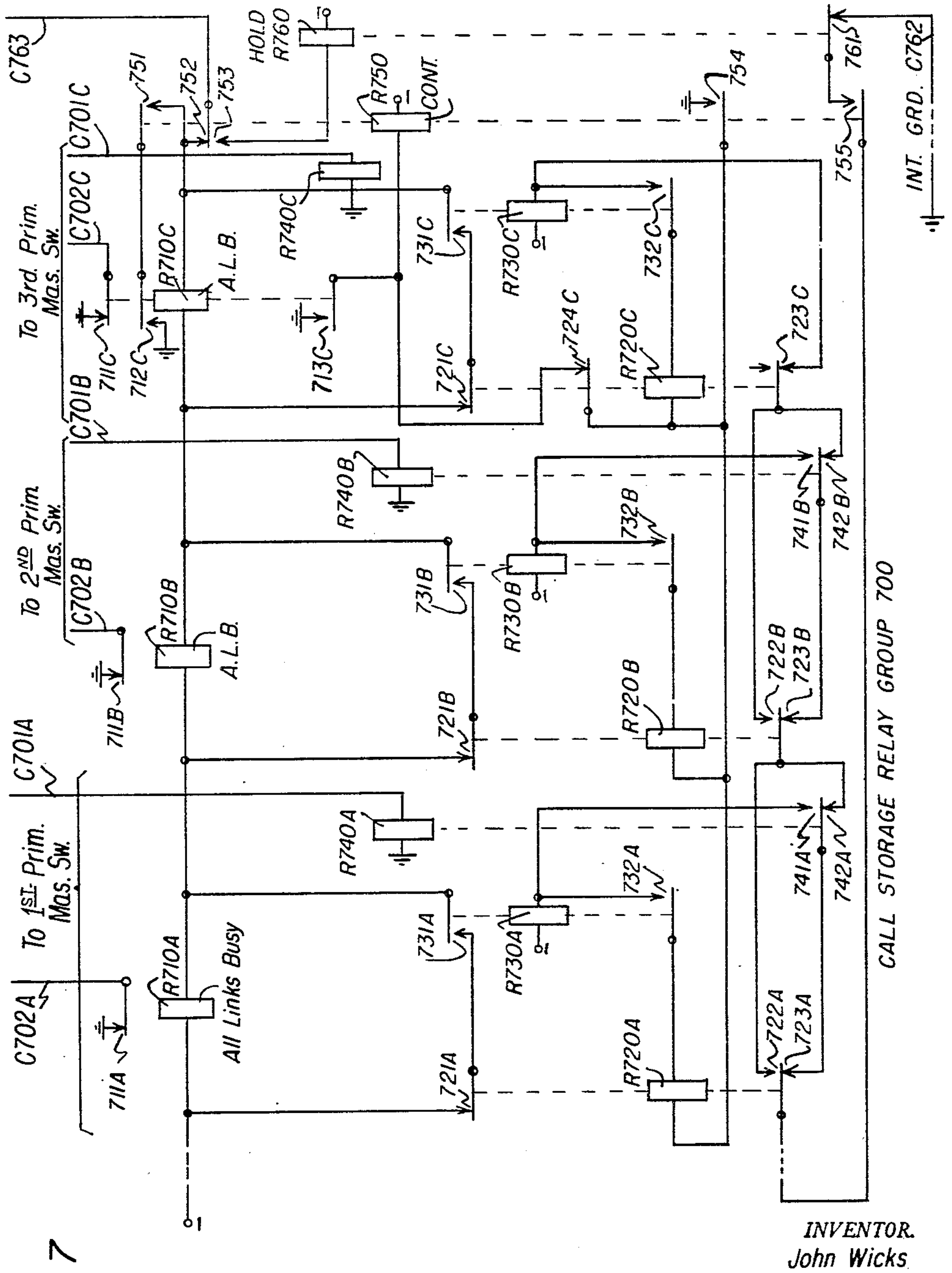

Fig. 7 discloses a call storage relay group 700 which is utilized to store incoming toll calls received by the plunger type line switches, including the switch 210, at a time when the secondary plunger type switches, including the switch 310, is unable to select an idle link at an operator position.

Referring now more particularly to Fig. 1B of the drawings, there is illustrated in Figs. 2 to 6, inclusive, the same switching apparatus as is illustrated in the corresponding drawings of the arrangement illustrated in Fig. 1A. However, in the arrangement illustrated in Fig. 1B, Figs. 8 and 9 have been substituted in place of the arrangement illustrated in Fig. 7 in order to show a modified call storage arrangement. Thus, the previous description of the circuits and apparatus illustrated in Figs. 2 to 6, inclusive, applies to the modified system illustrated in Fig. 1B but the call storage circuits and apparatus illustrated in Figs. 8 and 9 utilize plunger type line switches and a master switch in place of the relay type storage equipment illustrated in Fig. 7.

Figure 8:
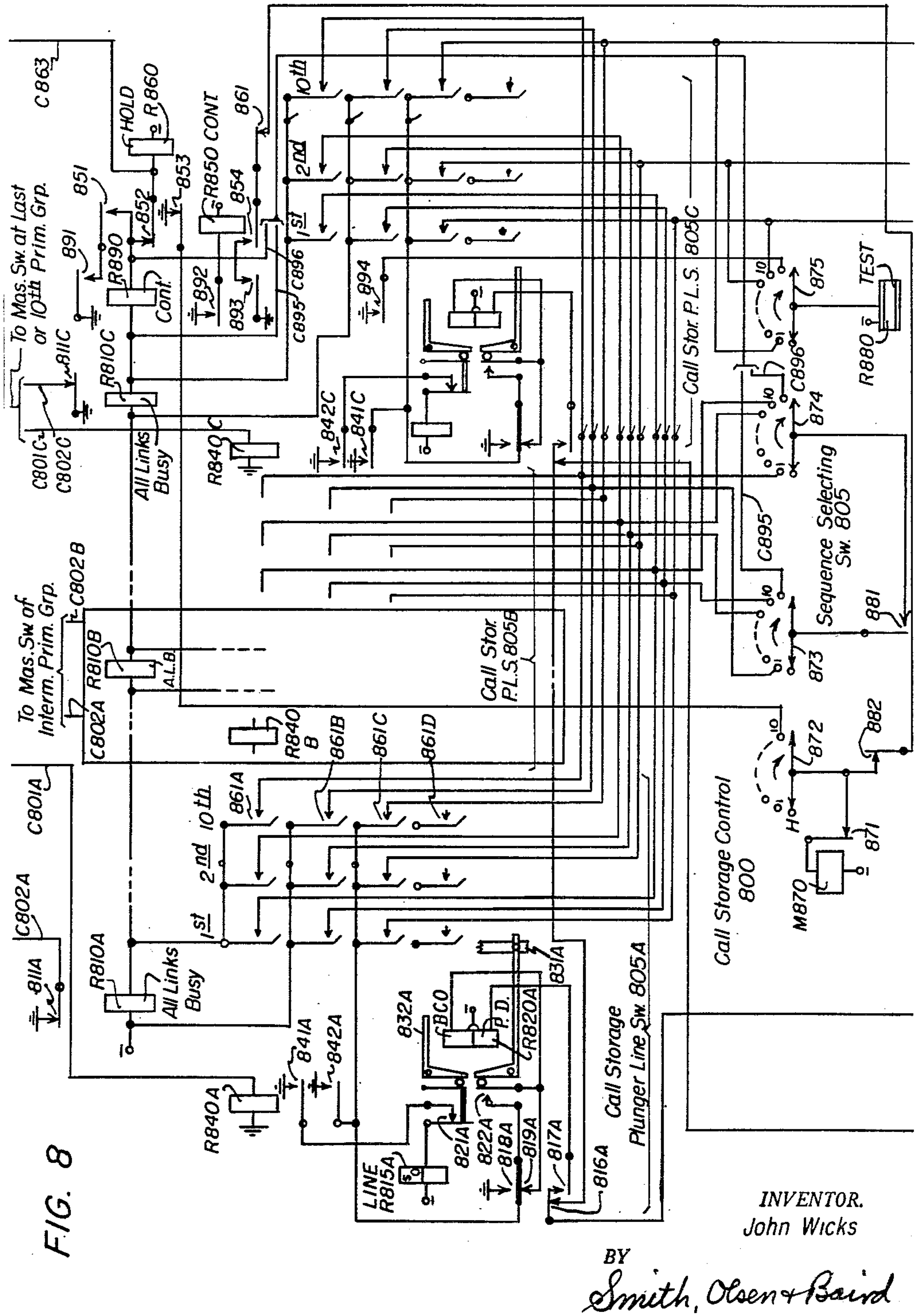

More particularly, Fig. 8 discloses the call storage control equipment 800 which includes a plurality of call storage plunger line switches, such as the switches 805A, 805B and 805C, and a sequence selecting switch 805 of the rotary type for selecting the calls stored in the call storage switches in a predetermined order.

Fig. 9 discloses a call storage control master switch 900 which is operative to control the plunger arms of the call storage switches, including the switch 805A, so that they will plunge into the associated banks to store calls in the event that the calls can not be distributed to the operator links by means of the primary and secondary plunger line switches.

Figure 10:
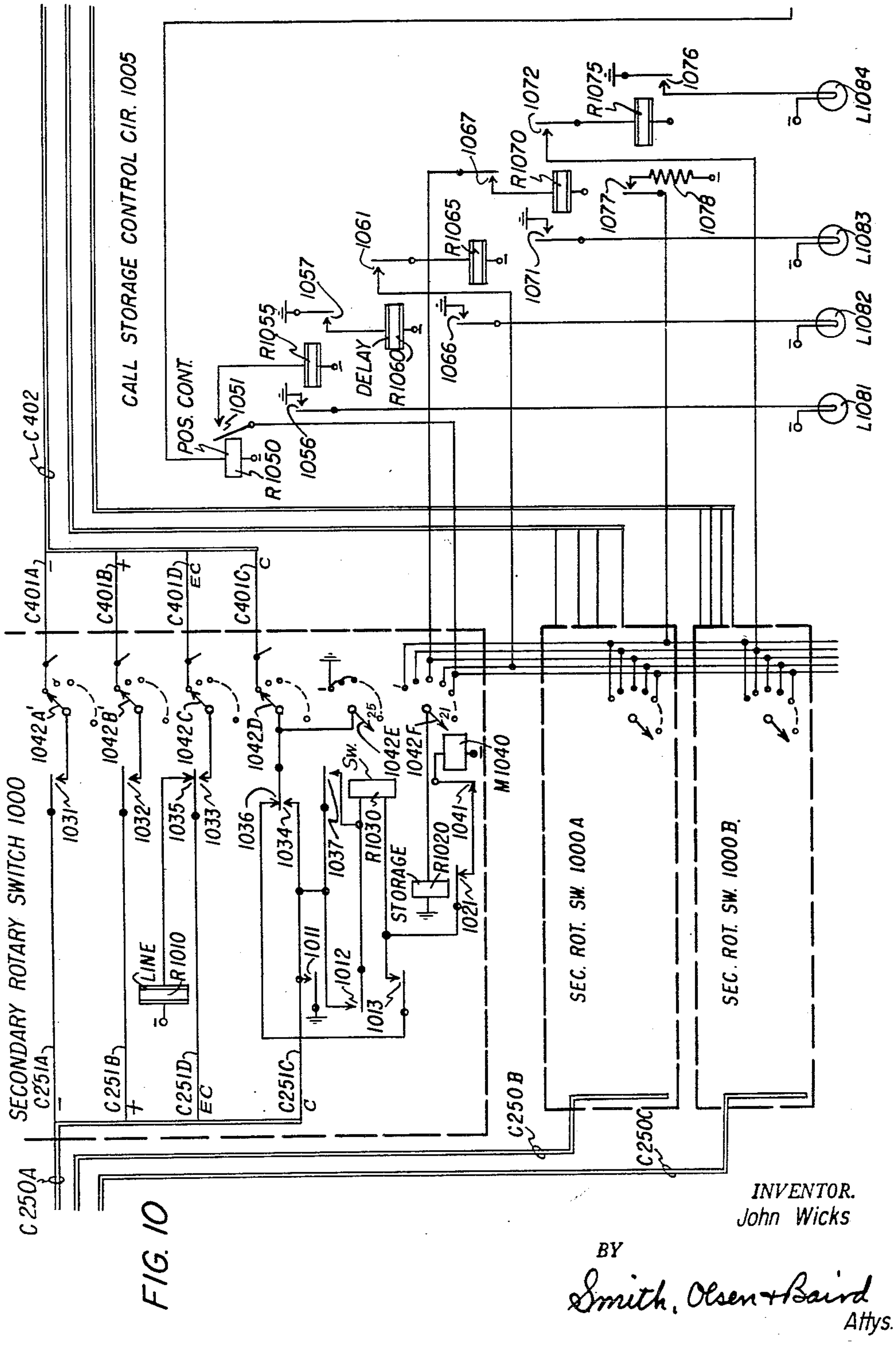

Referring now more particularly to Fig. 1C of the drawings, there is illustrated in Figs. 2, 4, 5 and 10 still another form of call distributing and storage apparatus. In this arrangement the primary line switches and the master switch illustrated respectively in Figs. 2 and 5 and the operator positions with the associated links, as illustrated in Fig. 4, is again utilized in substantially the same manner as has been described above in connection with the forms of the invention illustrated in Figs. 1A and 1B. However, in this modified arrangement, Fig. 10 has been interposed between Figs. 2 and 4 in place of the previously noted secondary line switches and secondary master switch of Figs. 3 and 6, respectively. Thus, in this modified arrangement, the primary line switches, including the line switch 210, is controlled by means of the associated master switch 500 to select one of the secondary rotary switches, including the secondary rotary switch 1000 (Fig. 10).

Fig. 10 discloses a secondary rotary switch 1000 which is provided with a plurality of wipers having access to trunk lines extending to idle links at the operator positions of Fig. 4. Also, the secondary rotary switch 1000 has access by way of certain of its wipers to the call storage control circuit 1005 which comprises a plurality of relays and signal lamps, whereby calls received by the secondary rotary switches, including the switch 1000, may be temporarily stored in the event that they can not immediately be distributed to idle links at the operator positions.

Before describing the operation of the call distributing and call storage arrangements illustrated in the drawings, a brief description will be given of the apparatus including the plunger type primary line switch 210 and the associated primary master switch 500 illustrated respectively in Figs. 2 and 5. At the outset it should be noted that the plunger type line switch 210 includes a line relay R215 and a combined bridge cut-off and pull-down relay R220. The plunger type switch also includes a plunger arm 231 having a plunger portion (not shown) carried upon the end of the plunger arm which is adapted, when the arm 231 is attracted by the relay R220, to force the plunger into a bank of contact springs in order to force the springs 241A, 241B, 241C and 241D to close. Also, the plunger arm is adapted to close corresponding contacts of nine additional sets of contact springs in a similar manner depending upon the position of the plunger arm as governed by the primary master switch 500.

The relay R220 also controls a cut-off arm 232 at the same time the plunger arm 231 is actuated and it controls the cut-off arm 232 independently of the plunger arm 231 when only the upper bridge cut-off winding of the relay R220 is energized. The relay R220 comprises two windings, namely, the lower winding which may be referred to as the pull-down winding and the upper winding which may be referred to as the bridge cut-off winding. The lower pull-down winding of the relay R220, when energized, is strong enough to operate both the plunger arm 231 and the bridge cut-off arm 232, while the upper bridge cut-off winding is only strong enough to operate the bridge cut-off arm 232 and to hold the plunger arm 231 in an operated position after it has once been actuated under control of the lower pull-down winding of the relay R220. The line relay R215 is of the slow-to-operate and slow-to-release type and is arranged so that it will remain in its operated position for a short period of time after its energizing circuit has been broken. Although three sets of contact springs, such as the contact springs 241A to 241D, inclusive, has been shown, it should be understood that at least ten sets of contact springs are provided corresponding respectively to ten trunks extending to corresponding secondary plunger type line switches or to ten rotary type lines switches in accordance with the three systems illustrated in Figs. 1A to 1C, inclusive. Each of the ten contact sets for each plunger type line switch are respectively multiple to the negative, positive, C and EC conductors associated with each line switch. In addition thereto, each of the corresponding four conductors of the ten trunk lines are respectively multiply connected to each of the corresponding sets of contact springs for each plunger type line switch controlled by a master switch. With this arrangement the actuation of the plunger arm of any line switch in a group will connect its negative, positive, C and EC conductors to any one of the ten trunks extending to the next switching stage. The particular trunk line that is selected is determined by the position assumed by the plunger shaft controlled by the associated master switch. Normally, the master switch will have its shaft so that it will align the plungers of all of the plunger line switches in the associated group with a set of contact springs connected to an idle outgoing trunk line. If one of the line switches is actuated, its plunger arm will engage the set of contact springs in order to connect its four above noted conductors to the preselected idle trunk line. As a result thereof, the master switch is automatically operated to move its shaft one step and thereby align the remaining plungers of the line switches in the associated group with the next set of contact springs associated with the next idle trunk line. Preferably, the plunger arms of each of the line switches are of the self-aligning type, i. e., they are constructed and arranged so that they will disconnect from the master switch shaft when they are plunged into the associated set of contact springs and when they are released from the plunged-in position, they always return to locking engagement with the master switch shaft and automatically are aligned thereby in front of the set of contact springs corresponding to an idle trunk selected by the master switch shaft. A self-aligning plunger line switch of the type noted is disclosed in the Oberzfell Patent No. 1,720,342, granted July 9, 1929.

The primary master switch 500 illustrated in Fig. 5, as well as the remaining master switches illustrated in the drawings, is constructed and arranged so that it will position its master switch shaft in alignment with the sets of contact springs associated with an idle trunk line and thereby automatically align all of the plunger arms of the line switches in the associated group so that they may plunge into the sets of contact springs terminating the idle trunk line. A master switch of the type noted is disclosed in the Keith Patent No. 1,185,510 granted May 30, 1916. Each time a trunk line is selected by the actuation of a plunger arm of one of the line switches, the master switch immediately steps all of the remaining idle line switch plunger arms to a position opposite an available trunk. With this arrangement, an idle trunk is preselected by the primary master switch prior to the operation of any line switch. The electro-motive power for operating the master switch shaft 583 from the contact springs corresponding to the trunks 1 to 10, inclusive, is supplied by the solenoid type magnet M580 and the power for moving the master switch shaft 583 in the opposite direction from the contact springs corresponding to trunk lines 10 to 1, inclusive, is furnished by the U-shaped spring 584. The speed at which the master switch shaft and the associated line switch plunger arm move over the different contact sets is controlled by a governer (not shown) at approximately 105 oscillations per minute. The locking relay R560 is operated each time a line switch plunger arm is actuated into an associated set of contact springs and by means of its armature 563 and the mechanical link 564 pivoted at 586, disengages the locking lever 565 from the locking segment of the master switch and permits the U-shaped spring 584 to move the master switch shaft 583 in a counterclockwise direction and thus moves all of the associated line switch plunger arms in a corresponding direction. As soon as the master switch is thus stepped, the locking relay R560 is restored to permit the locking lever 565 to engage the next notch of the locking segment. This will hold all idle line switch plunger arms opposite the contact springs of the next available trunk line. When the master switch segment has been rotated in a counter-clockwise direction to position the plunger arms of the line switches opposite the contact springs of the first trunk line, the segment arm 585 thereof closes the contacts 555 in order to prepare a circuit for operating the master switch solenoid magnet M580. After the first trunk has been selected by the actuation of a line switch plunger arm, the trip relay R550 is operated in order to energize the master switch solenoid magnet M580. The relay R550 is designed so that it will mechanically lock its armature 550A by means of the spring 556 engaging the catch on the latch spring 557. Consequently, the mechanical locking arrangement maintains the contact springs of the trip relay R550 in their operated position after the operating circuit for the relay has been interrupted at the contacts 555. The magnet M580 will pull its plunger into the coil winding and move the locking segment of the master switch shaft 583 in a clockwise direction in order to position all of the plunger arms of the associated line switches from a position corresponding to the first trunk to a position corresponding to the tenth or last trunk. When the trunk position 10 is reached the locking segment will be positioned so that its segment arm 586 will disengage the mechanical lock by moving the spring 557 away from the locking spring 556. The armature and contact springs of the trip relay R550 now restore to their normal positions and the trip relay interrupts the operating circuit for the solenoid magnet M580. Consequently, the U-shaped spring 584 is now conditioned to rotate the master switch shaft 583 in a counter-clockwise direction each time the locking relay R560 actuates the locking lever 565. Each time the locking lever 565 is momentarily withdrawn, the spring 584 rotates the master switch shaft and the locking lever 565 will engage the next notch in the segment. As soon as the master switch segment is moved in the counter-clockwise direction to a position corresponding to position 1, the segment arm 585 will reclose the contacts 555 in order to reoperate the trip relay R550 and thereby control the magnet M580 to return the master switch shaft in a clockwise direction to position the plunger arms of the line switches opposite the tenth set of contact springs.

*Operation of the system illustrated in Fig. 1A*

In order to describe the call distributing and storage arrangement comprising Figs. 2 to 7, inclusive, which are combined in the manner illustrated in Fig. 1A, it will be assumed that the trunk circuit 200 and other similar trunk circuits 200A, etc., terminate in individual primary plunger line switches, such as the line switches 210 and 210A. Furthermore, it will be assumed that the trunk circuit 200 is connected to the two-way toll line 201 over which toll calls may be received from a distant automatic exchange or a distant manual exchange in the manner described in the above mentioned Crocker and Molnar patents. If the toll line 201 is connected to a distant automatic exchange, the control signals transmitted to the trunk circuit 200 are extended over the two line conductors of the toll line 201 in parallel forming the conventional simplex control arrangement. On the other hand, if the toll line terminates in a distant manual exchange, the control signals are transmitted over the toll line 201 by means of the usual ring-down control in order to operate the trunk circuit 200. Since these operations are conventional, they have not been disclosed in detail in Fig. 2 and reference may be had to the above mentioned patents for the details thereof. If a local subscriber in the exchange, including the equipment illustrated in Figs. 2 to 7, inclusive, desires to extend a connection to the toll switchboard illustrated in Fig. 4, the trunk circuit 200 will then be selected over a local automatic switch train in a conventional manner. In the latter case, the usual CLR operating facilities are provided in the trunk circuit so that the trunk circuit 200 will operate in substantially the same manner as it does in response to incoming toll calls from distant exchanges.

In view of the foregoing, it will be understood that upon receipt of a toll call, the trunk circuit 200 will operate and thereby cause the operation of the relay R201. Upon operating, the relay R201 will complete, at its contacts 202, a circuit including its lower winding, the EC conductor C207, contacts 221 and the winding of the slow-to-operate and slow-to-release line relay R215. In this circuit both the relay R201 in the trunk circuit 200 and the line relay R215 in the line switch 210 operate.

At this point it may be well to mention that the primary master switch 500 and the secondary master switch 600 automatically function to align the plunger arms of the associated groups of line switches opposite contact sets terminating idle trunk lines extending to the next switching stage. Thus, the primary master switch 500 will align the plunger arms of the group of line switches including the line switch 210 and 210A opposite the contact springs terminating, for example, the tenth trunk line C250C. The secondary master switch 600 will align the plunger arms of the secondary line switches in the associated group including the line switches 310 and 310A opposite the contact springs terminating the first trunk line C402.

In view of the foregoing operation of the line relay R215, at its contacts 216, it interrupts a point in the chain circuit for the open chain relay R510 which now restores to normal and in turn completes an obvious circuit, at its contacts 511, for illuminating the supervisory lamp L512. Also, at its contacts 217 the line relay R215 completes a circuit for the lower pull-down winding of the relay R220. This circuit may be traced from battery by way of the lower winding of the relay R220, contacts 217, 521, the lower winding of the relay R530, contacts 574, strap 576, conductor C702A and contacts 711A to ground. In this circuit it should be noted that the upper low resistance winding of the delay relay R530 is short circuited at the contacts 522 and 532. However, the relay R530 operates over the circuit including its high resistance lower winding but the relay R220 does not operate at this time. As soon as the relay R530 operates, it removes the short circuit from its low resistance upper winding and, at its contacts 533, connects the low resistance upper winding in parallel with the high resistance lower winding, thus reducing the total resistance of the circuit in series with the lower pull-down winding of the relay R220. The current flow through the lower winding of the relay R220 is now sufficient to operate both the plunger arm 231 and the bridge cut-off arm 232.

Operation of the bridge cut-off arm 232 interrupts, at the contacts 221, the previously traced circuit for the line relay R215 but this relay does not restore immediately due to its slow-to-release characteristics. The operation of the plunger arm 231 closes contact springs 261A to 261D associated with the tenth set of bank contacts inasmuch as the primary master switch 500 has aligned all of the plunger arms of the line switches in the group with the tenth set of contact springs. Also, the plunger arm 231 upon operating, closes the contacts 222 in order to complete a circuit from ground at contacts 218 for energizing the upper bridge cut-off winding of the relay R220. Energization of the upper winding of the relay R220 will hold both the plunger arm 231 and the bridge cut-off arm 232 in their actuated positions even after the energizing circuit for the lower winding of the relay is interrupted.

As soon as the plunger arm 231 engages the tenth set of contact springs as noted above, the ground potential at contacts 218 is extended over the C conductor C206, contact springs 261C, the wiper 581 engaging the associated contact 10 and the upper winding of the start relay R570, to battery. Also, the ground potential applied to the C conductor C206 completes an operating circuit for the relay R203 in the trunk circuit 200, which relay marks the associated trunk circuit busy to further calls. As a further result of the actuation of the plunger arm 231, the contact springs 261A to 261D, inclusive, extend the negative, positive, C and EC conductors in the line switch 210 to the corresponding conductors in the cable C250C extending to an idle secondary plunger line switch. The latter plunger line switch may, for example, be in a group of secondary line switches controlled by a secondary master switch (not shown) but which is similar to the secondary master switch 600.

It will be recalled that due to its slow-to-release characteristics that the relay R215 has not yet restored to normal. Therefore, when the start relay R570 operates over the above traced circuit including its upper winding, it interrupts, at its contact 574, the previously traced circuit for energizing the lower pull-down winding of the relay R220. Although the energizing circuit for the lower winding of the relay R220 is now interrupted, the plunger arm 231 and the cut-off arm 232 are retained in their operated position over the previously traced circuit including the upper winding of the relay R220.

As soon as the connection, including the negative, positive, C and EC conductors C204 to C207, inclusive, are connected through to the corresponding conductors in the cable C205C by operation of the plunger arm 231 into the tenth set of contact springs, the ground potential on the EC conductor C207 operates a secondary plunger line switch and the secondary plunger line switch, in turn, further extends the connection through to an idle link at one of the operator positions of the switchboard schematically illustrated in Fig. 4. As a result of the foregoing operations, a holding ground potential is returned over the C conductor of the connection in order to retain the secondary plunger line switch and the primary line switch in their operated positions. More specifically, the ground potential is returned over the C conductor in the cable C250C by way of the contact springs 261C, contacts 222 and the upper bridge cut-off winding of the relay R220, to battery. Furthermore, this ground potential retains the relay R203 in the trunk circuit 200 in its operated position. After the ground potential is returned over the C conductor, as noted above, the slow-to-release line relay R215 will restore to normal. It is apparent from the foregoing description that in order to prevent the restoration of the plunger line switch 210 (also the operated secondary line switch) the link circuit at the operator position must return the holding ground potential over the C conductor, to hold the upper winding of the relay R220 energized before the line relay R215 has restored to normal. This ground potential also marks the contact 10 of the set of bank contacts accessible to the wiper 581 of the primary master switch 500 busy so that the master switch will no longer align the plunger arms of the other line switches in the group with the tenth set of contact springs.

As previously described, when the plunger arm of the line switch 210 plunges into the tenth set of contact springs, ground at the contacts 219 of the operated line relay R215 completes an operating circuit for the start relay R570 of the primary master switch 500. Also, the start relay R570 upon operating, at its contacts 574, interrupts a point in the initial energizing circuit for the lower winding of the relay R220 and, at its contacts 573, it completes a circuit which may be traced from ground by way of the contacts 711A, conductor C702A, jumper 576, contacts 573 and the winding of the lock relay R560, to battery. A branch of the above traced circuit includes the conductor C512 extending to traffic meters in order to maintain a record of the number of times that the start relay R570 is operated.

As soon as the lock relay R560 operates, it actuates its armature 563 in order to windraw the locking lever 565 from the locking segment so that the U-shaped spring 584 may now rotate the master switch shaft 583 and the locking segment in a counter-clockwise direction. This moves all of the plunger arms of the line switches in the group controlled by the primary master switch 500 one step so that they are in alignment with the sets of contact springs terminating the ninth trunk line. However, since the plunger arm 231 of the line switch 210 has been actuated into the tenth set of contact springs, the movement of the master switch shaft does not affect the plunger arm of the line switch 210.

It should be noted that when the master switch shaft 583 is rotated in the counter-clockwise direction the wipers 581 and 582 which are controlled by the master switch shaft, also rotate in a counter-clockwise direction from engagement with the contacts 10 in the associated banks into engagement with the contacts 9. As soon as the wiper 581 disengages its bank contacts 10, the previously traced circuit for the start relay R570 is interrupted and the relay restores to normal. Restoration of the relay R570 interrupts, at its contacts 573, the circuit for the locking relay R560 which relay now restores to normal to permit the locking arm 565 to engage the notch in the locking segment corresponding to the ninth trunk line. Therefore, the plunger arms of all of the idle line switches in the group are now aligned opposite the contact springs terminating the ninth trunk line.

During the time that the locking relay R560 was in its operated position, a circuit is completed from ground at contacts 561, for operating the chain control relay R520. Upon operating, the chain control relay R520, at its contacts 521 and 522, interrupts a point in the previously traced chain circuit in order to prevent any line switch in the group of line switches controlled by the master switch 500 from actuating its plunger arm during the time that the master switch is rotating its shaft to select another idle trunk line.

If the ninth trunk line is in use at the time the wiper 581 engages its contact 9, ground potential thereon will reoperate the start relay R570 and the latter relay will reoperate the lock relay R560 to permit the U-shaped spring 584 to further rotate the master switch shaft to align the plunger arms of the idle line switches with the eighth trunk line. The above described cyclic operations of the start relay R570 and the lock relay R560 will continue as long as ground potential is encountered by the wiper 581. Due to the fact that the chain control relay R520 is provided with a local short-circuit for its lower winding, including its contacts 524, the relay is somewhat slow-to-restore to normal and is accordingly retained in its operated position during the time that the start relay R570 and the lock relay R560 control the step-by-step counter-clockwise movement of the master switch shaft 583.

In order to describe the operation of the secondary plunger line switch 310 (Fig. 3) it will be assumed that the above described incoming toll call received by the trunk circuit 200 controls the primary plunger line switch 210 in the manner described above at the time that the master switch 500 has aligned the plungers of all of the line switches with the contact springs corresponding to the first trunk line C250A. Consequently, the ground potential on the EC conductor C207 will be extended by way of the contact springs 241D, conductor C251D in the trunk line C250A, contacts 322 and the winding of the line relay R315, to battery. As is illustrated in Figs. 3 and 6 the secondary master switch 600 has selected the idle trunk line C402 terminating in the first set of contact springs by aligning the plunger arms of all of the secondary line switches in the group therewith. Accordingly, at its contacts 317 the line relay R315 completes a circuit for operating the lower pull-down winding of the relay R320. This circuit may be traced from battery by way of the lower winding of relay R320, contacts 317 and 621, the lower high resistance winding of the delay relay R630 and contacts 672 and 691, to ground. In this circuit the high resistance of the lower winding of the relay R630 prevents energization of the relay R320 but the relay R630 operates and, at its contacts 633, connects its low resistance upper winding in multiple with its high resistance lower winding and thus reduces the total resistance in the circuit so that the lower winding of the relay R320 receives sufficient current to operate. Energization of the relay R320 actuates the plunger arm 331, whereupon, the arm plunges into the contact springs associated with the first trunk line in order to close the contact springs 341A to 341D, inclusive. As a further result of the operation of the line relay R315, at its contacts 316, it interrupts a point in the chain circuit for the open chain relay R610. The relay R610 restores to normal and, at its contacts 611, completes an obvious circuit for operating the delay relay R601A. The latter relay upon operating, actuates its make contact thereby to vibrate its associated weighted make spring. When the vibration of the make spring terminates, the slow-to-operate relay R610B will operate in an obvious manner and, at its make contacts, it completes an obvious circuit for operating the kick-off relay R601E. The make contacts 602 and 603 and additional similar make contacts, if necessary, apply ground potential to certain of the contacts in the kick-off contact bank accessible to the wiper 582 of the primary master switch 500. The last-mentioned circuit is provided so that the start relay R570 will operate to control the automatic advancement of the master switch shaft 583 so that it will not align any of the plunger arms of the plunger line switches in the associated group with any trunk line extending to secondary plunger line switch in the group including the secondary line switch 310.

As a further result of the actuation of the plunger arm 331, the contacts 322 are opened in order to interrupt the circuit for the line relay R315. However, due to its slow-to-release characteristics the relay R315 does not immediately restore to normal. The operating ground potential applied to the EC conductor C251D is now further extended by way of the contacts 341D, conductor C401D in the first trunk line C402 to the link 415 at the first operator position 410. This ground potential now completes the operating circuit for the relay R435 in order to seize the link. At the contacts 436, the relay R435 completes a circuit including the contacts 452 for illuminating the supervisory lamp L460. As a further result of the operation of relay R435 circuits are completed (not shown) for operating the relay R445 and the latter relay, at its contacts 446, returns ground potential over the C conductor C401C in the trunk line C402.

Referring now to Fig. 3, it will be seen that the ground potential applied to the conductor C401C is extended by way of the contact springs 341C to the upper bridge cut-off winding of the relay R320 thereby to retain the last-mentioned relay and its associated plunger arm 331 in its actuated position after the circuit for the lower winding of the relay R320 is interrupted. A branch of the above traced circuit includes the conductor C251C in the trunk line C250A, the contact springs 241C, contacts 222 and the upper bridge cut-off winding of the relay R220 in order to retain the plunger arm 231 actuated after the circuit for the lower winding of the relay R220 is interrupted. Finally, the ground potential on the C conductor is further extended by way of the conductor C206 in order to retain operated the relay R203 in the trunk circuit 200 and maintain the same busy to other incoming toll calls. Referring again to Fig. 3 it will be seen that the ground potential applied to the conductor C401C is further extended to the secondary master switch (Fig. 6) in order to operate the first trunk busy relay R602C1 and to complete a circuit for the start relay R670 by way of the master switch wiper 681. Similarly, in the primary master switch 509 (Fig. 5) the ground potential applied to the C conductor C251C, completes a circuit for operating the start relay R570 by way of the master switch wiper 581 which is in engagement with the bank contact 1.

As soon as the start relay R670 of the secondary master switch 600 is operated, as noted above, at its contacts 672, it removes the operating ground potential from the circuit including the multiple connected windings of the relays R630 and the lower winding of the relay R320 of the plunger line switch 310. Also, at its contacts 673, the start relay retains the delay relay R601A in its operated position and, at its contacts 671, it now applies ground potential, at the contacts 691 of the operated relay R601D, to the winding of the lock relay R660 in order to operate the later relay. As a result thereof, the armature 663 withdraws the locking lever 665 from the associated master switch segment. A branch of the above traced circuit for operating the relay R660 extends by way of the contacts 655 and the winding the trip relay R650, to battery. At this point it should be noted that the segment arm 685 of the master switch 600 has mechanically closed the contact 655 due to the fact that the notch in the segment corresponding to the trunk line 1 has been reached by the counter-clockwise movement of the master switch shaft 683. Consequently, the operation of the start relay R670 causes the lock relay R660 to withdraw the locking lever 665 from the notch in the segment of the master switch shaft 683 and it completes a circuit for operating the trip relay R650. As soon as the trip relay R650 operates, the armature 650A moves its associated spring 656 sufficiently to engage the catch on the locking spring 657. This mechanically locks all of the contact springs on the trip relay R650 in their operated positions after the winding of the trip relay R650 has been deenergized by the opening of the contacts 655 when the segment arm 685 is withdrawn therefrom. At its contacts 651, the trip relay R650 completes a locking circuit for the lock relay R660 so that the latter relay will prevent the locking lever 665 from engaging the notches in the segment of the master switch shaft 683 while the shaft is moving in a clockwise direction. Also, at its contacts 652 the trip relay R650 completes an obvious circuit for energizing the solenoid magnet M680. Upon energizing, the solenoid magnet M680 pulls its plunger into its coil winding against the tension of the U-shaped spring 684 thus moving the segment of the master switch shaft 683 in a clockwise direction. As soon as the shaft moves one step away from the position 1 the segment arm 685 opens the contacts 655 thereby to interrupt the energizing circuit for the trip relay R650. However, due to the mechanical locking arrangement described above, the armature and various contacts on the trip relay are maintained in their operated positions. As soon as the master switch shaft 683 has been rotated in a clockwise direction to again align all of the plunger arms of the idle plunger line switches with the tenth trunk line, the segment arm 686 moves the catch on the locking spring 657 from engagement with the armature spring 656 and thereby permits the armature 650A and the associated contacts to restore to the normal position illustrated in the drawings. When this occurs the contacts 652 are opened in order to interrupt the energizing circuit for the solenoid magnet M680 and the contacts 651 are opened in order to interrupt the circuit for the locking relay R660. The latter relay now restores to normal and by means of its armature 663 permits the locking lever 665 to enter the notch in the segment of the master switch shaft 683 corresponding to the tenth trunk line position. During the interval that the trip relay R650 was held in its operated position, at its contacts 653 it retained the operating circuit for the relay R610A and the lock relay R660, at its contacts 662 also retained a multiple holding circuit for the relay R601A. In addition thereto, the relay R660, at its contacts 661, operates the chain control relay R620 in order to prevent the operation of any line switch in the secondary group served by the secondary master switch 600. Furthermore, as the wiper 681 of the master switch 600 rotates in a clockwise direction, it may pass over contacts in its associated bank that are marked with a busy ground potential. The start relay R670 may periodically operate and restore as a result thereof, but it performs no selective control during the time that the master switch shaft is rotating in a clockwise direction from the position corresponding to the trunk line 1 to the position corresponding to the trunk line 10.

From the foregoing description it will be understood that the secondary master switch 600 functions to realign all of the plunger arms of the secondary line switches in the associated group with the tenth trunk line as soon as the preselected first trunk line has been taken into use by one of the plunger secondary line switches. Thereafter, the U-shaped spring 684 will control the counter-clockwise movement of the master switch shaft in response to the selection of the trunks by the plunger arms of the associated line switches.

Referring now to the primary master switch 500 (Fig. 5) it will be recalled that the wiper 581 thereof is in engagement with the contact 1 in the associated bank at the time the primary plunger line switch 210 operated to plunge its plunger arm into the contact springs of the first trunk line. Furthermore, it will be recalled that ground potential is returned from the selected link at the operator switchboard to the conductor C251C and thereby completed a circuit including the wiper 581, and the upper winding of the start relay R570, to battery. At this time the start relay R570, at its contacts 574 removes ground potential from the previously traced circuit including the windings of the delay relay R530 and the lower pull-down winding of the relay R220 in the line switch 210. Since the upper bridge cut-off winding of the relay R220 is now energized and locked to the grounded C conductor C206, the plunger arm 231 and the bridge cut-off arm 232 remain in their operated positions. As a further result of the operation of the start relay R570, at its contacts 573, a circuit is completed from ground at the contacts 711A by way of the conductor C702A, the strap 576 and the contacts 573 for operating the lock relay R560. This relay upon operating, withdraws the locking lever 565 from the first notch in the master switch segment in the manner previously described and a branch of the above traced circuit is completed by way of the contacts 555 and the winding of the trip relay R550 in order to operate the latter relay. It should be noted, however, that the contacts 555 are closed by the segment arm 585 when the master switch shaft 583 has its wipers 581 and 582 in engagement with the contacts 1 in the associated contact banks which correspond to the first trunk line. As soon as the trip relay R550 operates, it actuates its armature 550A thereby to move the locking spring 556 over the catch on the spring 557 thereby to mechanically lock all of the contact springs on the trip relay in their operated positions. Accordingly, at its contacts 551 the trip relay R550 energizes the solenoid magnet M580 in order to draw its plunger into its coil winding against the tension of the U-shaped spring 584 in order to move the shaft 583 of the master switch in a clockwise direction. As a further result of the operation of the trip relay R550, at its contacts 552, it completes a locking circuit for the lock relay R560 in order to retain the latter relay in its operated position as the solenoid magnet M580 rotates the master switch shaft in the clockwise direction. As soon as the segment arm 585 of the master switch moves away from the position 1 the contacts 555 are opened in order to interrupt the energizing circuit for the trip relay R550. However, the latter relay does not restore to normal at this time due to the fact that it is mechanically locked in its operated position by the spring 556 and the cooperating catch on the spring 557. As soon as the master switch shaft 583 reaches its position 10, corresponding to the trunk line 10, the segment arm 586 moves the catch spring 557 away from the locking spring 556 and thus unlocks the mechanical lock of the trip relay R550 to restore all of the contact springs to the position illustrated in the drawings. During the movement of the master switch shaft from the position corresponding to the trunk 1 to the position corresponding to the trunk 10, the start relay R570 may be momentarily reoperated as the wipers 581 and 582 pass over contacts of busy trunk lines. Due to the fact that the lock relay D560 is retained in its operated position during the return movement of the master switchshaft, the grounded contacts 561 retains the chain control relay R520 operated and thereby interrupts at the contacts 521 and 522 the chain circuit for operating the delay relay R530. The interruption in the chain circuit will prevent any primary plunger line switch in the group served by the master switch 500 from plunging its associated plunger arm into one of the contact sets during the rotary movement of the master switch shaft. However, as soon as the position corresponding to the trunk 10 is reached, the trip relay R550 and the lock relay R560 restore to normal in the manner described previously and the latter relay interrupts, at contacts 561, the circuit for the chain control relay R520. This relay slowly restores to normal and recompletes the chain circuit, including contacts 521 and 522, so that the plunger arm of one of the line switches in the group may be actuated if the line relay thereof has been operated.

At the present time the toll connection received on the trunk circuit 200 is now extended by way of the contact springs 241A to 241D of the primary plunger line switch 210, the trunk line 250A, the contacts 341A to 341D of the secondary plunger line switch 310, the trunk line C402 and the link 415 at the first operator position 410. The operator may now converse with the distant toll subscriber or operator, as the case may be, and upon ascertaining the destination of the toll call may then control the sender 425, the sender control circuit 420 and the selector 430 individual to the link 415 in a conventional manner to extend the toll call to the desired destination. After performing the above operations, the toll operator at the first operator position 410 of the switchboard may disconnect from the link 415 thereby to interconnect the calling and called ends of the toll connection. Recall and disconnect supervision from the calling end of the connection is controlled over the EC conductor C207 of the trunk circuit 200 in a conventional manner so that the relay R435 in the link 415 will restore and illuminate the lamp L460. The illumination of the lamp L460 will indicate to the toll operator at the first position 410 of the switchboard that the calling end of the connection has been released or that it requires the operator's attention. If the connection is released, then the operator will operate a conventional link release key and cause the relay R445 in the link 415 to restore and remove, at its contacts 446, the holding ground potential from the C conductor C401C in the trunk line C402.

Referring now to the secondary plunger line switch 310 it will be seen that when the ground potential is removed from the C conductor C401C, the circuit for the upper bridge cut-off winding of the relay R320 is interrupted. This relay now restores to normal and as a result thereof, the plunger arm 331 is automatically withdrawn from the contact springs 341A to 341D, inclusive, and returns into engagement with the master switch shaft 683. In returning to engagement with the master switch shaft, the plunger arm 331 automatically aligns itself with the master switch shaft so that it is in a position to plunge into the contact sets corresponding to the trunk line preselected by the particular position of the master switch.

Also the removal of ground potential from the conductor C401C interrupts the circuit for the relay R601C1 (Fig. 6) thereby to recomplete at its lower break contacts a point in the multiple circuit for the relay R601D.

As a further result of the removal of ground potential from the conductor C401C, the holding ground potential is removed from the C conductor C251C extending to the primary plunger line switch 210. Accordingly, the locking circuit for the upper bridge cut-off winding of the relay R220 is interrupted and the relay restores to normal. At this time the armature 232 reconnects, at its contacts 221, the line relay R215 to the EC conductor C207 and the plunger arm 231 is withdrawn from the contact springs 241A to 241D in order to disconnect the first trunk line C250A from the line switch 210.

Referring now to the primary master switch 500 (Fig. 5) it will be seen that the removal of ground potential from the C conductor C251C also removes the busy marking ground potential from the contact 1 in the bank accessible to the wiper 581 of the master switch. This will indicate to the primary master switch 500 that the first trunk line C250A is again available for preselection.

From the foregoing description of the operation of the apparatus to distribute an incoming toll call by way of a primary plunger line switch and a preselected trunk line to a secondary plunger line switch and then by way of the preselected secondary trunk line to a link at one of the positions of the switchboard, that the apparatus utilized in establishing the connection is locked in its operated position from a ground potential returned over a C conductor from the selected link. This ground potential also controls both the primary master switch 500 and the secondary master switch 600 to prevent the latter switches from preselecting the busy trunk lines. As each secondary trunk line, such as the trunk line C402, becomes busy by the extension of a toll connection to one of the links at an operator position, the corresponding trunk busy relay, such as the relay R601C1 is operated. It is normally advisable in distributing the calls from the secondary plunger line switches to arrange the ten secondary trunk lines, such as the trunk line C402, to select links at different positions of the switchboard. For example, the first two trunk lines may connect with the first two links of the firest operator position; the second two trunk lines may connect with the first two links of the second position of the switchboard, etc., with the last two trunk lines 9 and 10 connected to the first two links of the fifth position of the switchboard. Thus, with five operator positions, the ten secondary trunk lines served by the secondary plunger line switches under control of the secondary master switch 600 will be divided between the links at the different operator positions so that links always will be available to the secondary plunger line switches served by the master switch 600. The remaining links at each of the five operator positions will be distributed equally to trunk lines available, for example, to a second and a third group of secondary line switches having associated secondary master switches.

In order to prevent a second toll call from being received at a link at an operator position at the time that the operator is handling a call on one of the links at her position, the position equipment is arranged in a conventional manner to apply a busy marking ground potential to the C conductor, such as the C conductor C401C, individual to each of the links at the busy position. Consequently, each trunk busy relay, such as the relay R601C1 (Fig. 6) corresponding to each of the secondary trunk lines connected to the links at the busy position will operate. Consequently, the contact banks accessible to the wiper 681, and the bank contacts of corresponding wipers in the other two secondary master switches in the three groups noted, are marked busy in order to prevent the corresponding master switches from preselecting any of the secondary trunk links extending to links at the busy operator position. If any secondary master switch has preselected the secondary trunk line of a link and it is marked busy, as noted above, the master switch will function in the manner previously described to preselect another secondary trunk line extending to an available link at one of the operator positions not busy handling a toll call. It should be noted, however, that as soon as the operator has extended an incoming toll call through the link at her position to a called destination, she will disconnect her position equipment from the link and thus render the remaining links at her position available for additional toll calls. In other words, when the operator withdraws from a toll connection, including one of her links, the busy marking ground potential is removed from the C conductors of all of the remaining links at her position to render them selectable by the secondary master switches.

If each of the five operators at the five positions of the switchboard are busy handling a toll call received over one of the links at the associated positions, all of the secondary trunk lines, such as the trunk line C402, will be marked busy in the three groups of secondary line switches. In Fig. 6, the secondary master switch 600, corresponding to the first group of secondary plunger line switches, the ten trunk busy relays R601C1, R601C2 to R601C10, inclusive, will operate, inasmuch as the corresponding ten trunk lines terminating the links at each of the five operator positions will be marked busy. Also, the ten contacts corresponding to the ten trunks accessible to the master switch wiper 681 will also be marked with a busy ground potential. When the ten busy trunk relays R601C1, etc., are in their operated positions, they interrupt the multiple holding circuit for the relay R601D which now restores to normal. Upon restoring the relay R601D, at its contacts 692, completes the previously traced circuit for the kick-off relay R601E. Consequently, the kick-off relay R601E individual to the secondary master switch 600, operates. The same operations occur in the secondary master switch individual to the second group of secondary plunger line switches, and also in the third secondary master switch individual to the third group of secondary plunger line switches. The kick-off relays, corresponding to the relay R601E, individual to the second and third secondary master switches are schematically illustrated and respectively designated R601F and R601G in Fig. 6. Consequently, when the links at the five positions of the switchboard are all busy, the kick-off relays R601E, R601F and R601G operate. The kick-off relay R601 by means of its contacts, such as the contacts 602 and 603, applies a busy marking ground potential to the corresponding contacts in the kick-off bank accessible to the wiper 582 of the primary master switch 500. Additional contacts (not shown) on the kick-off relay R601E also apply a busy marking ground potential to contacts in the kick-off bank of other primary master switches having trunk lines extending to the secondary plunger line switches served by the secondary master switch 600. In this manner each of the primary master switches, such as the master switch 500, are prevented from selecting trunk lines extending to the secondary plunger line switches in the group controlled by the secondary master switch 600.

The second group kick-off relay R160F is provided with additional contacts (not shown) similar to the contacts 602 and 603 for applying busy marking ground potentials to the corresponding contacts in the kick-off bank of each of the primary master switches and the third group kick-off relay R601G is provided with corresponding contacts for applying busy marking ground potential to the kick-off bank contacts of the primary master switches. With this arrangement, the instant that all of the links at the five positions of the switchboard are marked busy, the first, second and third group kick-off relays R160E, R601F and R601G, individual to the three secondary master switches will operate in order to indicate to each of the primary master switches that all of the links at the operator positions are busy and that the secondary master switches cannot preselect a trunk line extending to an idle link.

Referring now to the secondary master switch 600, it will be recalled that the start relay R670 will operate over a circuit including the master switch wiper 681 each time the C conductor connected to the associated contact is grounded to indicate that the corresponding trunk line is busy. In the present example, the ten contacts accessible to the master switch wiper 681 are grounded and, consequently, the start relay R670 is in its operated position. Normally, the ground potential at the contacts 691 will be extended by way of the contacts 671 to operate the lock relay R660 and if the secondary master switch is in the position illustrated in the drawings, the ground potential completes the operating circuit for the trip relay R650 in the manner previously described. This will control the master switch to rotate its shaft 683 to the position corresponding to the trunk 10 so that the U-shaped spring 684 will control the stepping of the master switch shaft from the position corresponding to the trunk 10, step-by-step to the position corresponding to the trunk 1. If the start relay R670 is reoperated each time the wiper 681 engages a busy bank contact, the master switch shaft 683 would be stepped bask to position 1 where the cycle of operation would be re-established. In other words, the master switch shaft would continue to oscillate between the positions corresponding to the trunk lines 1 and 10.

In order to avoid the oscillatory movement of the master switch shaft 683 during the period of time that all of the contacts accessible to the master switch wiper 681 are busy, the relay R601D in restoring to normal, in the manner described above, removes ground potential at the contacts 691 in order to prevent the lock relay R660 and the trip relay R650 from rotating the master switch shaft 683 in the clockwise direction until an idle trunk line, such as the trunk line C402, is available.

The same oscillatory movement of the primary master switch shaft 583 will also occur if all of the contacts in the master switch bank, accessible to the wiper 581, are busy or if all of the contacts in the kick-off bank, accessible to the wiper 582, are busy. In the present example, it has been assumed that the three groups of secondary plunger line switches controlled by the three secondary master switches cannot preselect available trunk lines extending to the operator links and, consequently, the contacts in the kick-off bank accessible to the wiper 582 and corresponding contacts in the kick-off banks of the other primary master switches are also marked with a busy ground potential.

In order to prevent the primary master switches from oscillating the master switch shaft, such as the shaft 583, between the position corresponding to the trunks 1 and 10 and to provide an arrangement for storing an incoming toll call received on a primary plunger line switch at the time all of the links at the operator positions are busy, the call storage relay group (Fig. 7) has been provided. Thus, when the three kick-off relays R601E, R601F and R601G are operated, ground potential at the contacts 604 of the kick-off relay R601E is extended by way of corresponding contacts on the kick-off relays R601F and R601G to the conductor C763 extending to Fig. 7. Referring now to Fig. 7, it will be seen that the ground potential applied to the conductor C763 is further extended by way of the contacts 752 and the windings of the all-links busy relays R710C, R710B and R710A in series, to battery. The three all-links busy relays R710A to R710C, inclusive, correspond respectively to the three primary master switches, such as the primary master switch 500. As soon as the above traced circuit is completed, the three relays R710A to R710C, inclusive, operate and at their contacts 711A, 711B and 711C remove ground potential from the conductors C702A, C702B and C702C. The removal of ground potential from the conductor C702A will prevent the operation of the lock relay R560 of the primary master switch 500 and, if the master switch is in a position corresponding to the trunk line 1, it will also prevent the operation of the trip relay R550. Consequently, the master switch 500 will not oscillate the master switch shaft 583 between the positions corresponding to the trunks 1 to 10 at a time when the all-links busy relay R710A is in its operated position. The same operations are effective in controlling the second and third primary master switches corresponding respectively to the all-links busy relays R710B and R710C. As a further result of the operation of the all-links relay R710C, at its contacts 713C, it completes an obvious circuit for operating the control relay R750. The latter relay upon operating, at its contacts 751, completes a locking circuit from ground at contacts 712C for locking the three all-links busy relays R710A to R710C, inclusive, in their operated positions. Also, at its contacts 753, the relay R750 connects the grounded conductor C763 to the hold relay R760 in order to operate the latter relay. As soon as the relay R760 operates, it opens a point, at its contacts 761, in a circuit traced hereinafter for controlling the relays R730A to R730C, inclusive. The above conditions of the relays R710A to R710C, inclusive, relay R750 and relay R760 will be retained until a link circuit at one of the operator positions is rendered available to one of the secondary line switches controlled by the three secondary master switches.

However, during the interval of time that no link circuit is available at an operator position, an incoming toll call may be received on one of the trunk circuits, such as the trunk circuit 200. When this occurs, the previously traced circuit will be completed for the line relay R215 and the latter relay will operate to complete a circuit which may be traced from battery by way of the lower pull-down winding of relay R220, contacts 217 and 521, the high resistance lower winding of the delay relay R530, the strap 536, conductor C701A and the high resistance winding of the relay R740A to ground. A branch of the above circuit extends from one of the terminals of the strap 536 to the contacts 574, but due to the fact that the start relay R570 is retained in its operated position from the grounded kick-off bank contacts accessible to the wiper 582, the last-mentioned branch circuit is rendered ineffective.

When the above traced series circuit, including the lower winding of the relay R220, the lower winding of the relay R530 and the winding of the relay R740A is completed, the relays R740 and R530 operate, but due to the high resistance of the lower winding of the relay R530 and the winding of the relay R740A, the relay R220 does not receive sufficient current to operate. As soon as the relay R530 operates, it connects its low resistance upper winding in mulitple with its high resistance lower winding in the manner previously described, but in spite of the fact that the resistance in the circuit is now reduced, the relay R220 cannot operate due to the fact that the high resistance winding of relay R740A is still in series with the circuit for relay R220. As soon as the relay R740A operates, it prepares, at its contacts 741A, a point in the incomplete circuit for operating the relay R730A.

The above described operations involving the call storage relay group 700, the primary master switch 500 and the primary plunger line switch 210 will store the incoming toll call received by the trunk circuit 200 until a trunk line, extending to a secondary line switch and a trunk line extending to an idle link circuit, is available. Other incoming toll calls may be received by other primary plunger line switches, such as the plunger line switch 210A, and stored therein in substantially the same manner as has been described above. Also, additional toll calls may be stored in the plunger line switches in the groups controlled by the second and third primary master switches. In the latter case, the operations of the relays R710B and R740B, as well as the relay R710C and the relay R740C will be the same as has been described above. Thus, incoming toll calls may be stored in the plunger line switches in each of the three groups of line switches for distribution to idle links at the operator switchboard as they become available for use.

When the operator at the first position of the switchboard completes a toll call distributed to a link at her position and withdraws from the link, the position equipment automatically functions to remove the busk marking ground potential from the C conductors of the remaining available links at her position. However, the link that is in use to complete the toll call maintains the busy marking potential on the C conductor individual to said link. As soon as the busy marking potential is removed from the available links at the operator position, at least one of the corresponding trunk busy relays, such as the relays R601C1 to R601C10, inclusive (Fig. 6), restore to normal. As a result thereof, the energizing circuit is completed for reoperating the relay R601D. Relay R601D upon operating, at its contacts 691 now completes the previously described circuit for operating the locking relay R660 and if the master switch has its shaft in alignment with the trunk line 1, the trip relay R650 will also operate. The last-mentioned operation of the locking relay R660 and the trip relay R650 is controlled only if the start relay R670 is held in its operated position from a busy trunk line. Therefore, if the secondary master switch 600 is in alignment with an idle trunk the start relay R670 will be in its restored position and will prepare a point in the circuit for the delay relay R630 and one of the line relays, such as the line relay R315, of one of the secondary plunger line switches. In other words, the plungers of the secondary plunger line switches will be in alignment with an available trunk line. However, if the start relay R670 is retained in its operated position due to the fact that the master switch wiper 681 is in engagement with a busy trunk line, the lock relay R660 and the trip relay R650 will cooperate in the manner previously described to cause the secondary master switch 600 to align the master switch shaft and the plungers of the secondary line switches with an idle trunk line extending to an idle link at one of the operator positions. Since it has been assumed that the first operator is available to handle another toll call, the secondary master switch 600 will preselect a trunk line extending to an idle link thereat.

As a further result of the reoperation of the relay R601D, at its contacts 692, it opens the circuit for the first group kick-off relay R601E, whereupon the latter relay restores to normal and at its contacts, such as the contacts 602 and 603, it removes the busy marking ground potential from the kick-off bank contacts of the master switches having trunk lines extending to the secondary plunger line switches included in the group of line switches controlled by the secondary master switch 600. As a further result of the restoration of the kick-off relay R601E, at its contacts 604, it removes ground potential from the conductor C763 extending to Fig. 7 thereby to restore the hold relay R760.

If the primary master switch wiper, such as the wiper 582, is standing on a kick-off bank contact which is no longer marked busy by the kick-off relay R601E, the circuit for the lower winding of the start relay R570 will be interrupted and if the associated master switch wiper 581, in engagement with the corresponding bank contact, fails to encounter a busy marking ground potential, the start relay R570 will retsore to normal. Restoration of the start relay R570 at this time prepares a circuit for short-circuiting the relay R740A.

In the event that the start relay R570 is maintained in its operated position over a circuit including its master switch wiper 581 or 582, the master switch 500 will in that event be controlled by the call storage relay group 700. More specifically, when the hold relay R760 restores to normal as noted above, at its contacts 761, it connects the conductor C762 by way of the contacts 755, 723A and 741A and the winding of the relay R730A, to battery. The last-mentioned circuit, however, is dependent upon the relay R740A being held in its operated position in series with the relay R530 and the pull-down winding of the relay R220 as previously described. The conductor C762 is periodically grounded by an interrupter (not shown) and when the ground potential is applied thereto the relay R730A operates. At its contacts 731A, the relay R730A completes an obvious short-circuit for the all-links busy relay R710A, whereupon, the latter relay restores to normal and completes, at its contacts 711A, a circuit including the conductor C702A, the strap 576, contacts 573 and the winding of the lock relay R560, to battery. If the master switch is in the position illustrated in Fig. 5, the operation of the lock relay R560 will withdraw the locking lever 565 from the master switch segment and permit the U-shaped spring 584 to move the master switch one step in a counter-clockwise direction to position the master switch wipers 581 and 582 into engagement with the contacts 9 in the associated contact banks and to align the plungers of the associated group of line switches with the ninth trunk line. As the wipers 581 and 582 advance from the contacts 10 to the contacts 9, the start relay R570 will restore to normal and interrupt the circuit for the lock relay R560. If the ninth trunk line is busy, the start relay R570 will reoperate in the manner previously described in order to again control the lock relay R560 and advance the master switch shaft an additional step. The foregoing operations are performed at a high rate of speed, thus enabling the master switch shaft to preselect one of the idle trunk lines extending to a secondary plunger line switch that has preselected an idle trunk line to an available link at the operator position.

In order to prevent the momentary restoration of the start relay R570 from completing the operating circuit for one of the pull-down windings, for example, the pull-down winding of relay R220 from operating at this time, the lock relay R560 completes, at its contacts 561, an obvious circuit for operating the chain control relay R520. This relay, as previously described, is of the slow-to-release type due to its short-circuited lower winding and it also interrupts, at its contacts 521 and 522, the circuit of the delay relay R530 and the pull-down winding of relay R220. Consequently, during the stepping of the master switch shaft, the momentary restoration of the start relay R570 does not complete the circuit for actuating the plunger arm of one of the seized primary line switches. However, if the start relay R570 remains in its restored position to indicate the selected trunk line is idle, the chain control relay R520 will subsequently restore to normal and thus will complete the previously traced circuit for operating the pull-down winding of the relay R220 in series with the upper and lower windings of the delay relay R530. Consequently, the plunger arm 231 of the primary arm switch 210 will now be actuated to select the preselected trunk line extending to the secondary plunger line switch in the group of line switches controlled by the secondary master switch 600. As a result of the selection of the trunk line the start relay R570 will be reoperated in the manner previously described to prepare the circuit for the lock relay R560, whereby the master switch will preselect the next idle trunk line.

Referring to Fig. 7, it will be recalled that the first ground pulse appearing on the C conductor C762 operated the relay R730A in order to restore the all-links busy relay R710A. As a result of the foregoing, the master switch 500 found and preselected the available trunk line and permitted the stored call on the primary plunger line switch 210 to be extended over the preselected trunk line to an idle secondary plunger line switch. The subsequent operations, whereby the secondary plunger line switch further extends a call to an idle link at the first operator position and whereby the secondary master switch 600 preselects another idle link is the same as has been described previously.

During the above described operations of the primary master switch 500, the start relay R570 restores to normal and, at its contacts 574, short-circuited the relay R740A. Normally, the short ground impulse on the conductor C762 will be removed therefrom before the relay R740A restores to normal and incident to its removal the relay R730A locks itself in its operated position over a circuit including its contacts 732A, the winding of the relay R720A, conductor C756 and ground at contacts 754. When the above traced locking circuit is completed, the relay R720A operates and, at its contacts 721A, interrupts the short-circuit from the relay R710A, whereupon, the latter relay reoperates in series with relays R710B and R710C.

In view of the foregoing description, it will be appreciated that one of the toll calls stored on one of the primary plunger line switches in the group of line switches controlled by the primary master switch 500 has been distributed to an idle link at an operator position as soon as such a link is available. Additional calls may be stored on other line switches in the same group but, by means of the call storage relay group 700, additional calls can not be distributed until stored calls in the second group of line switches controlled by a second primary master switch and calls stored in a third group of line switches controlled by a third primary master switch have also been distributed.

If at least one call is stored in the primary line switches, the relay R740B will be operated so that the second ground pulse received on the conductor C762 will operate the relay R730B in the same manner as relay R730A. The remaining operations, including the relays R710B, R720B, R730B and R740B are precisely the same as the corresponding relays having the same designations followed by the suffix A. Consequently, the second master switch will permit a call stored in one of the line switches of the associated group to select a secondary line switch to distribute the call to an idle link at one of the operator positions.

The third group of call storage relays are substantially the same as the first and second groups of relays except that the suffix designation C has been utilized.

If it is assumed that a call is stored in a primary line switch in the group of line switches controlled by the third primary master switch, the next ground pulse appearing on the conductor C762 will be transmitted over a circuit including the contacts 761, 755, 722A, 722B and 723C and the winding of the relay R730C, to battery. This circuit, however, will only be completed if the relay R760 has been restored to normal to indicate that a link is available at one of the positions of the switchboard. As soon as the relay R730C operates it short-circuits the relay R710C, whereupon, the latter relay restores to normal and interrupts, at its contacts 712C, the previously traced locking circuit for the relays R710A, R710B and R710C. These relays all restored to normal. As a further result of the restoration of the relay R710C, at its contacts 713C, it interrupts a point in the multiple holding circuit for the control relay R750. Finally, at its contacts 711C, the relay R710C reapplies ground potential to the conductor C702C, whereby the third primary master switch is controlled in the manner described previously to preselect an idle trunk line and to permit a call stored on one of the line switches in the associated group to be distributed by way of a secondary line switch to an idle link at one of the positions of the switchboard.

As soon as the ground pulse on the conductor C762 is removed therefrom, the relay R730C locks itself over a circuit including its contacts 732C, the winding of the relay R720C, conductor C756 and ground at contacts 754. When the above mentioned locking circuit is completed, the relay R720C operates and interrupts, at its contacts 724C, the final holding circuit for the control relay R750 which now restores to normal. Upon restoring to normal, the relay R750, at its contacts 755, interrupts a point in the circuit including the conductor C762; at its contacts 754, it removes ground potential from the conductor C756 thereby to interrupt the multiple holding circuits for the relays R720A and R730A, the relays R720B and R730B, and the relays R720C and R730C; and at its contacts 752, it reconnects the conductor C763 to the previously described series circuit for the all-links busy relays R710A to R710C, inclusive. Accordingly, the call storage relay group 700 is now reconditioned to be cyclically controlled in the manner previously described to distribute one stored call in each of the three groups of primary line switches to idle links at the operator position as soon as such links become available.

However, the cyclic operation is dependent upon whether or not the conductor C763 is grounded to indicate that at the present instant all of the available links at the operator switchboard are busy. If the latter condition is assumed, the relays R710A, R710B and R710C are reoperated in the manner previously described, the relay R750 is operated under control of the contacts 713C and it locks itself in its operated position from ground at contacts 754. As soon as relay R750 reoperates, it completes at the contacts 751, the locking circuit for the all-links busy relays and it completes, at contacts 753, the previously described circuit for operating the hold relay R760. If an additional call is still stored in a line switch in the group of line switches controlled in the primary master switch 500, the relay R740A will be in its operated position and if no calls are stored in the second or third group of line switches, the relays R740B and R740C will be in their restored positions. If a link should now become available for use, one of the secondary master switches, such as the master switch 600, will be controlled to restore its associated kick-off relay R601E, R601F or R601G and thus cause the restoration of the hold relay R760. As previously described, a ground pulse on the conductor C762 will now be transmitted to the winding of the relay R730A in order to restore the all-links busy relay R710A and replace the operating ground on conductor C702A. This operating ground potential will control the lock relay R560 in the manner previously described to permit the primary master switch 500 to preselect the trunk line extending to an idle secondary plunger line switch in the group of secondary line switches controlled by the particular secondary master switch in which the kick-off relay has restored to normal. Therefore, the start relay R570 and the lock relay R560 will cooperate in the manner previously described to align the plunger arms of the line switches in the group controlled by the master switch 500, with an idle trunk line. Also, when this occurs the delay relay R530 and the pull-down winding of the relay, such as the relay R220, in the primary plunger line switch having the call stored therein will operate its plunger arm to extend the call stored therein to the preselected idle trunk line. The call is accordingly extended to one of the secondary plunger line switches, which in turn operates its plunger arm to further extend the toll call to the idle link at the operator position.

As soon as the ground pulse is removed from the conductor C762, the relay R730A and the relay R720A lock in series as previously described. The relay R720A, at its contacts 721A, removes the short-circuit from the relay R710A which now reoperates and, at its contacts 722A, the relay R720A prepares a circuit for transmitting the next ground pulse on the conductor C762 to the relay R730B if a call is stored in the second group of primary line switches or for transmitting the next ground pulse to the relay R730C if no call is stored in the second group of primary line switches.

Accordingly, it will be assumed that no additional calls are stored in the line switches of the three groups noted and that links are available at the various positions of the switchboard. The next ground impulse appearing on the conductor C762 will now be transmitted by way of the contacts 761, 755, 722A, 723B, 742B and 723C in order to operate the relay R730C. This relay short-circuits the all-links busy relay R710C, as previuosly noted, thereby to interrupt the locking circuit for the latter relays and, at its contacts 713C, it opens a point in the initial operating circuit for relay R750. At the end of the ground impulse, the relay R730C locks itself in series with the relay R720C; the latter relay interrupts the locking circuit for relay R750; and the relay R750 now restores to normal to interrupt, at its contacts 754, the locking circuits for any of the relays which are held operated to the grounded conductor C756. The call storage relay group has again been restored to normal and is in condition to reoperate whenever all of the links at the different positions of the switchboard are unavailable to receive toll calls.

From the foregoing description of the call storage relay group 700, it will be understood that a number of calls may be stored in the line switches associated with the three primary master switches at a time when all of the links at the operator positions are busy. It will also be understood that as soon as one or more links become available, one stored call in the group of line switches controlled by the primary master switch 500 will be distributed to the idle link; the next call, if an idle link is available, will be distributed from a plunger line switch controlled by the second primary master switch; and a third call will thereafter be distributed to an idle link from a line switch in the group controlled by the third primary master switch. The call storage relay group 700 will cyclically operate, as the links become available, to distribute one call from each group of plunger line switches in the order named. However, with the call storage arrangement illustrated in Fig. 7, the calls stored on the various groups of line switches are not necessarily distributed to idle links at the operator positions in the order in which they are received. The control of distribution is arbitrarily based on the cyclic operations of the call storage relay group 700 to permit one call in each line switch group to be distributed one at a time and in a sequential order. In the event that no call is stored in the group of line switches controlled by, for example, the first master switch, then the group of relays of the call storage relay group 700, corresponding to that master switch, does not receive a ground pulse from the conductor C762 but the pulse is transmitted to the group of relays in the call storage relay group 700 associated with the next master switch having a line switch in the associated group with a call stored thereon.

*Operation of the system illustrated in Fig. 1B*

The call distributing and storage arrangement, comprising Figs. 2 to 6, inclusive, and Figs. 8 and 9 and combined in the manner illustrated in Fig. *1B*, is substantially the same as the system comprising Figs. 2 to 7, inclusive, combined in the manner illustrated in Fig. 1A except that the call storage control apparatus illustrated in Figs. 8 and 9 has been substituted for the call storage relay group 700 illustrated in Fig. 7.

Inasmuch as the circuits and apparatus disclosed in Figs. 2 to 6, inclusive, have been described in detail in connection with the system illustrated in Fig. 1A, they will be only briefly discussed in describing the system illustrated in Fig. 1B. Thus, it will be understood that an incoming toll call received at the trunk circuit 200 (Fig. 2) will be routed to one of the links at an idle operator position by way of one of the primary plunger line switches and one of the secondary plunger line switches over trunk lines that have been preselected by the respective primary and secondary master switches. In other words, incoming toll calls will be automatically distributed to idle links at the operator positions, provided the operators at the respective positions of the switchboard are not busy in the actual setting-up of a received toll connection. As long as idle links are available for the distribution of incoming toll calls, the call storage control apparatus illustrated in Figs. 8 and 9 is rendered inoperative. However, as previously described, in connection with the system illustrated in Fig. 1A, as soon as all of the links at the different positions of the switchboard are marked busy, the trunk busy relays, such as the relays R601C1, etc., of the different groups of secondary line switches, are operated to control the operation of the relay R601D and, thus, prevent the associated secondary master switches from oscillating the master switch shafts at a time when an all-links busy condition is encountered. Also, the above noted condition causes the operation of the different kick-off relays R601E, R601F and R601G, and if additional secondary groups are provided, the corresponding kick-off relays will also be operated, in order to apply ground potential to the conductor C763. In the system illustrated in Fig. 1B, the conductor C763 is connected to a corresponding conductor C863 illustrated in Fig. 8, whereas, in the system illustrated in Fig. 1A this conductor is connected to a corresponding conductor C763 in Fig. 7.

Referring now to Fig. 8, it will be seen that the application of ground potential to the conductor C863 will complete an operating circuit for the hold relay R860 and in multiple therewith, it completes a circuit including the contacts 852, control relay R890 and the three illustrated all-links busy relays R810A, R810B and R810C, in series. Consequently, the relays R810A, R810B and R810C operate in order to remove ground potential from the conductor C802A to C802C extending to the corresponding primary master switches.

In the system illustrated in Fig. 1A, it has been arbitrarily assumed that three primary master switches have been provided for three corresponding groups of primary line switches. However, it should be understood that additional groups of primary master switches may be utilized in the present system in accordance with the traffic requirements and in the event additional groups of primary master switches are provided, additional all-links busy relays, such as the relay R810A, and associated apparatus must be provided in Fig. 8 for each additional master switch group. However, for the purpose of describing the present system, it will be assumed that ten groups of primary line switches are required.

As a further result of the operation of the control relay R890 an obvious circuit is completed, at contacts 892, for operating the control relay R850. As soon as the relay R850 operates, it completes, at its contacts 851, a circuit including ground at contacts 891 for locking the all-links busy relays R810A, etc., and the control relay R890 in their operated position over a circuit that is independent of the initial operating circuit. Also, at its contacts 852, the relay R850 disconnects the conductor C863 from the circuit of the control and all-links busy relays.

The call storage control apparatus 800 and the associated call storage master switch 900 are now in condition to store toll calls received by any primary plunger line switch in any one of the ten groups served by the ten primary master switches. However, before describing the storage of a call, the apparatus included in the call storage control equipment of Figs. 8 and 9 will be described. Since each all-links busy relay, such as the relay R810A, corresponds to a primary master switch serving a group of primary plunger line switches there has been provided one call storage plunger line switch for each all-links busy relay. In Fig. 8, the all-links busy relay R810A is associated with the call storage plunger line switch 805A, the all-links busy relay R810B is associated with a similar call storage plunger line switch (not shown) and the all-links busy relay R810C is associated with the call storage plunger line switch R805C. Each call storage plunger line switch includes a line relay R815A, a combined pull-down and bridge cut-off relay R820A, a plunger arm 831A and ten associated sets of contact springs forming an associated bank for connecting the associated plunger line switch to any one of ten different trunk lines terminating in the banks of a sequence selecting switch 805. Since three call storage plunger line switches, 805A to 805C, are illustrated, the corresponding elements in the three plunger line switches are designated by the same three digits followed by the suffix letter corresponding to the associated group A, B or C. An additional call storage plunger line switch (not shown) is also provided for each additional group of primary plunger line switches and such call storage plunger line switches will be the same as the line switch 805A.

In order to align the plunger arms of the call storage plunger line switches with the ten sets of contact springs in the associated banks in a predetermined order, the call storage control master switch 900 has been provided. This master switch is substantially the same as the primary master switch 500 illustrated in Fig. 5 except that the master switch kick-off bank has been omitted and the start relay R970 has been provided with a single winding. From the previous description of the primary master switch 500, it will be understood that the call storage master switch 900 operates in the same manner to align the plunger arms of the call storage plunger line switches with the different contact sets in the associated contact banks.

It will now be assumed that a toll call is received on the trunk circuit 200 and has caused the operation of the line relay R215 in the primary plunger line switch 210 after the all-links busy relays R810A, etc., have been operated. As a result thereof, a circuit is completed which may be traced from battery by way of the lower pull-down winding of relay R220, contacts 217 and 521, the lower winding of relay R530, strap 536, conductor C701A extending to Fig. 8 and connected to conductor C801A, and the winding of relay R840A, to battery. The relays R840A and R530 operate over this circuit but due to the high resistance of the windings of these relays, the relay R220 in the primary plunger line switch 210 does not operate. The operation of relay R530 has been previously described and will not be repeated at this time. However, as soon as the relay R840A operates, it completes, at its contacts 841A, a circuit including the contacts 821A for operating the line relay R815A of the call storage plunger line switch 805A. Relay 815A upon operating, at its contacts 817A, completes a circuit from battery by way of the lower pull-down winding of the relay R820A, contacts 817A and 921, the high resistance lower winding of the delay relay R930 and ground at contacts 972. In this circuit the relay R930 operates but due to the high resistance of its lower winding, the relay R820A does not operate. As soon as the relay R930 operates it completes, at its contacts 933, a circuit for connecting its low resistance upper winding in multiple with its high resistance lower winding thereby to reduce the total resistance in the circuit for the lower winding of relay R820A which now operates.

As a result of the operation of the relay R820A, the plunger arm 831A is actuated to plunge into the tenth set of bank contacts, thereby to close the contacts 861A to 861D, inclusive. The plunger arm 831A plunged into the tenth set of bank contacts, as noted above, because the call storage primary master switch 900 has its master switch shaft 983 and its associated wiper 981 positioned to align all of the plunger arms of the call storage plunger line switch 805A, etc., with the tenth set of contacts. Accordingly, it will be apparent that if the corresponding plunger arm of the call storage plunger line switch 805C is actuated instead of the plunger arm of the line switch 805A it would then plunge into its tenth set of bank contacts. As a further result of the actuation of the plunger arm 831A, at the contacts 822A, a circuit is completed for energizing the upper bridge cut-off winding of the relay R820A. This circuit may be traced from ground at contacts 842A and then by way of the contacts 822A and the upper winding of relay R820A, to battery. Energization of the upper winding of the relay R820A will retain the plunger arm 831A in its actuated position after the circuit for the lower pull-down winding of the relay is interrupted. However, if the bridge cut-off winding of the relay R820A is energized prior to energization of the lower pull-down winding, then the plunger arm 831A will not plunge into the associated bank and the cut-off armature 832A will operate to interrupt the contacts 821A The bridge cut-off arm 832A will be operated when the relay R820A is energized over either its upper or lower windings.

As a further result of the plunger arm 831A plunging into the tenth set of contact springs, the ground potential at contacts 842A is extended by way of the contact springs 861C to the bank contact 10 engaged by the master switch wiper 981 in order to complete the operating circuit for the start relay R970. Operation of the start relay R970 controls the lock relay R960 to cause the master switch 900 to rotate its wiper 981 into a clockwise direction and to move its shaft a corresponding distance to position the plunger arms of the remaining call storage plunger line switches into alignment with the ninth set of bank contacts. The detailed operations of the call storage control master switch 900 is the same as the primary master switch 500 previously described. As soon as the master switch moves its wiper 981 from engagement with the tenth contact in the associated contact bank, the start relay R970 restores to normal and, at its contacts 972, reapplies ground potential to the chain circuit including the lower winding of the delay relay R930, the contacts 921 and 816A, corresponding contacts of other call storage plunger line switches and the winding of the open chain relay R910, to battery. The last-mentioned chain circuit is completed as soon as the line relay R815A of the plunger line switch 805A restores to normal. The circuit for the last-mentioned relay is opened at the contacts 821A as soon as the plunger arm 831A is actuated but, due to its slow-to-release characteristics, the relay R815A is somewhat delayed in restoring to normal.

As a further result of the closing of the contact springs 861A to 861D, inclusive, by the plunger arm 831A, the winding of the all-links busy relay R810A is connected by way of the contact springs 861A and 861B to the contacts 1 in the banks accessible to the wipers 873 and 874 of the sequence selecting switch 805. Also, ground potential at the contacts 842A is extended by way of the contacts 861C to the contact 1 in the bank accessible to the wiper 875. Normally, the sequence selecting switch 805 has its wipers 872 to 875, inclusive, in engagement with the home contact positions as illustrated in the drawings.

At the present time the toll call received at the primary plunger line switch 210 has caused the operation of the call storage plunger line switch 805A and has been stored through the tenth contact set in the banks of the associated line switch on the contacts 1 of the sequence selecting switch 805.

It has been assumed in the foregoing description that the stored toll call is the first call that has been received by any primary plunger line switch after the operation of the all-links busy relays R810A, etc., and, consequently, it should be the first call that is to be distributed to an idle link at an operator position when such a link becomes available. It is for the latter reason that the first call is stored on the first contact set accessible to the sequence selecting switch 805.

Inasmuch as the call storage master switch 900 has now realigned the plungers of the remaining call storage plunger line switches so that they are now positioned opposite the ninth set of bank contacts (not shown) the next toll call received by a primary line switch in another group of line switches will control the call storage line switch, such as the line switch 805A, individual to the associated primary master switch group. In other words, if the next toll call is received in a line switch controlled by a primary master switch corresponding to the call storage plunger line switch 805C, that call will then be stored on the second set of contacts in the banks of sequence selecting switch 805. Thereafter, the call storage control master switch 900 will reoperate to position the plunger arms of the remaining call storage plunger line switches opposite the eighth set of bank contacts so that the next call received in another group of primary line switches will control the corresponding call storage plunger line switch to store the call on the third set of bank contacts accessible to the sequence selecting switch 805.

If ten groups of primary line switches are provided with ten associated primary master switches, ten corresponding call storage plunger line switches will be provided and a call may be stored by each call storage plunger line switch in the ten bank contacts accessible to the sequence selecting switch 805 in the exact order in which the toll calls are received after an all-links busy condition. Accordingly, each call storage plunger line switch, such as 805A, is individual to a primary master switch serving a group of primary line switches and will function in the manner described above to store at least one toll call received on a primary line switch in the associated group. Each additional toll call storage plunger line switch will function in the same manner to store a toll call received on a plunger line switch in the group that is controlled by the associated master switch. As each call storage plunger line switch is actuated to store a call it will select one of the ten sets of bank contacts in accordance with the preselection control of the associated call storage control master switch. Depending upon the order in which the toll calls are received in the different groups of primary line switches, the calls will be stored in the bank contacts of the sequence selecting switch 805 in the same order so that upon operating, the sequence selecting switch will select the stored calls in the same order that they are stored.

In order to describe the last-mentioned operation of the sequence selecting switch 805, it will be assumed that ten separate call storage plunger line switches, such as the line switch 805A, have been operated to store calls and, consequently, connections have been made through at least one set of bank contacts individual to each of the call storage plunger line switches, to the bank contacts accessible to the wipers of the sequence selecting switch 805. If the links at one or more positions of the operator switchboard become idle, due to the fact that the operator thereat is available to answer an additional call, ground potential will be removed from the C conductors of each of the available links at the switchboard and thereby cause the restoration of one or more of the trunk busy relays, such as the relay R601C1, in the secondary master switch 600. As soon as one of the trunk busy relays restores to normal, it will complete at its lower break contact the previously described circuit for reoperating the relay R601D and the latter relay, at its contacts 692, will interrupt the circuit for the kick-off relay R601E in the associated secondary master switch. Similar operations will also be performed in the other secondary master switch groups to restore the corresponding kick-off relays provided links accessible to such secondary master switches are available. Also, the reoperation of the relay R601D controls the secondary master switch 600 in the manner previously described so that it will align the plungers of the secondary plunger line switches in the associated group with a set of bank contacts terminating an idle link. The detailed operations of the secondary master switch 600 to preselect a trunk line extending to an idle link have been previously described.

As soon as the kick-off relay R601E or any other kick-off relay, such as the relays R601F and R601G, restore to normal, ground potential is removed from the control conductor C763 which is connected to the conductor C863 (Fig. 8) in order to restore the hold relay R860. Also, the restoration of the kick-off relay R601E will control the primary master switches having trunk lines extending to secondary plunger line switches in the group controlled by the secondary master switch 600 so that these primary master switches will align the plungers of the primary line switches in the associated group with the set of bank contacts terminating an idle trunk line extending to an available secondary plunger line switch.

Referring now to Fig. 8 it will be seen that as soon as the hold relay R860 restores to normal, it completes at its contacts 861, a circuit including the contacts 893, 854, 861, 882 and 871 for operating the magnet M870 of the sequence selecting switch 805. As soon as the magnet M870 operates, it interrupts, at its contacts 871, its initial operating circuit, whereupon, the magnet restores to normal in order to advance its wipers 872 to 875, inclusive, one step in a clockwise direction from the home contact positions into engagement with the contacts 1. As soon as the wiper 875 engages the contact 1, a test is made to determine the particular call storage plunger line switch that has been operated to store the first toll call and has plunged its associated plunger arm into its tenth set of bank contacts.

In the present example, it has been assumed that the call storage plunger line switch 805A has been operated to store the first toll call and has its plunger arm 831A plunged into the tenth set of bank contacts to close the contact springs 861A to 861D, inclusive. Since the relay R840A is in its operated position, as previously noted, at its contacts 842A, ground potential is extended by way of the contact springs 861C to the contact 1 engaged by the wiper 875 and then by way of the wiper 875 and the winding of the test relay R880, to battery. The relay R880 now operates and, at its contacts 882, it interrupts a point in the previously traced circuit for the magnet M870 thereby to prevent the magnet from advancing its wipers an additional step until the relay R880 subsequently restores to normal. Also, at its contacts 881, the relay R880 short-circuits the all-links busy relay R810A over a circuit which may be traced from the left-hand terminal of the winding of the relay R810A, contact springs 861B, bank contact 1 and the engaged wiper 873, contacts 881, wiper 874 and the engaged contact 1, contact springs 861A and the right-hand terminal of the winding of the relay R810A. When the above traced short-circuit is completed, the relay R810A restores to normal and, at its contacts 811A, it applies ground potential by way of the conductor C802A connected to the conductor C702A (Fig. 5), the strap 576, contacts 574 of the restored start relay R570, the windings of the delay relay R530 in multiple, contacts 521 and 217 and the lower pull-down winding of the relay R220, to battery. Inasmuch as the primary master switch 500 has been automatically controlled in the manner previously described to align the plunger arms of the plunger line switches in the associated group with a set of bank contacts terminating a trunk line, such as the trunk line C250A, extending to a secondary plunger line switch that has preselected an idle link, the operation of relay R220 will cause its associated plunger arm 231 to plunge into the first set of bank contacts in the manner previously described.

As a further result of the restoration of the all-links busy relay R810A, the ground potential at its contacts 811A also short-circuits the relay R840A. This short-circuit may be traced from ground at contacts 811A, conductor C802A connected to conductor C702A (Fig. 5) and then by way of the strap 576, contacts 574, strap 536, conductor C701A connected to conductor C801A (Fig. 8) and the winding of relay R840A, to ground. This short-circuit removes the high resistance of relay R840A from the above traced circuit for controlling the pull-down winding of the relay R220A thereby to permit the relay R220 to operate, as described, and the restoration of the relay R840A removes, at its contacts 842A, ground potential from the operating circuit for the test relay R880. Also the removal of ground potential, at the contacts 842A, interrupts the circuit, including the contacts 822A and the upper bridge cut-off winding of the relay R820A. Consequently, the call storage plunger line switch 805A now restores to normal due to the fact that its plunger arm 831A is withdrawn from the associated tenth set of contact springs and the bridge cut-off arm 832A is restored to normal.

The slow-to-release test relay R880 subsequently restores to normal and, at its contacts 881, it removes the above traced short-circuit from the winding of the all-links busy relay R810A, whereupon the latter relay reoperates in series with the other all-links busy relays and the control relay R890 to the locking ground at contacts 891. Also, at its contacts 882, the relay R880 recompletes the previously traced circuit for the magnet M870 whereupon the magnet operates and restores to advance its wipers 872 to 875, inclusive, an additional step into engagement with the contacts 2 in the associated contact bank.

If an additional line switch in the group of primary plunger line switches served by the primary master switch 500 is in its operated position due to the receipt of an incoming toll call, the call storage plunger line switch 805A may be operated in the manner previously described if the ten trunk lines selectable by the primary master switch 500 become busy immediately following the selection of an idle trunk line by the primary plunger line switch 210. This will permit the next toll call received in the associated primary plunger line switch to be stored in the call storage plunger line switch 805A. Normally, the all-trunks busy indication to the primary master switch 500 will be indicated by the operated condition of all of the kick-off relays associated with the secondary master switches and such an indication will cause the reoperation of the hold relay R860 in the call storage control equipment 800. In any event as soon as the relay R810A is reoperated by the advancement of the wipers of the sequence selecting switch 805 or by the withdrawal of plunger arm 831A from the associated set of bank contacts, the ground potential at the contacts 811A will prevent any primary plunger line switch in the group served by the primary master switch 500 from selecting an idle trunk line extending to one of the secondary plunger line switches.

As soon as the wipers of the sequence selecting switch 805 engage the contacts 2 in the associated contact banks, the all-links busy relay of the call-storage plunger line switch that has its plunger arm plunged into its ninth set of bank contacts will be short-circuited to permit a primary plunger line switch in a group served by a primary master switch corresponding to the short-circuited all-links busy relay to select the next available trunk line extending to an idle secondary plunger line switch. After the primary line switch has selected the next available trunk line the associated all-links busy relay will restore to normal. The test relay R880, having been operated, will restore to normal and cause the magnet M870 to advance its wipers an additional step to the next set of bank contacts where the above traced operations will be repeated in the same manner, provided available trunk lines may be selected by a primary plunger line switch in the group of line switches having the next received toll call stored therein.

The sequence selecting switch 805 will continue to operate in the manner described above to select each of its bank contacts one after another until the ten all-links busy relays R810A, R810B, R810C, etc., have been short-circuited to permit the calls stored in the associated call storage plunger line switches to be distributed to available links at the operator position in the order in which the toll calls are received in the different groups of primary line switches. When the tenth stored call has been distributed, the wipers of the sequence selecting switch 805 are advanced an additional step into engagement with the contacts 11 in the associated contact banks. When this occurs, the test relay R880 is immediately operated from ground at the contacts 894 on the operated control relay R890. Upon operating the test relay R880 interrupts, at its contacts 882, a point in the stepping circuit for the magnet M870 and, at its contacts 881, it completes a short-circuit, including the conductors C895 and C896, for the control relay R890. The relay R890 now restores to normal and, at its contacts 891, it interrupts a point in the series locking circuit for the all-links busy relays R810A, etc., and the control relay R890. Also, at its contacts 892, it interrupts the circuit for the control relay R850 which also restores to normal and, at its contacts 894, it interrupts the circuit for the test relay R880. Thus, the control relay R890 and the all-links busy relays, which have been locked in their operated positions, are now restored to normal so that the wipers of the sequence selecting switch 805 may be restored to the home contact position and conditioned to recomplete the cycle of operation in response to another all-links busy condition. When the control relay R850 restores to normal, as noted above, it again prepares, at its contacts 852, the previously described circuit for registering in the call storage control equipment 800 another all-links busy condition and, at its contacts 853, it applies ground potential to the contact 11 engaged by the wiper 872 of the sequence selecting switch 805. Consequently, the magnet M870 is momentarily reoperated and restored in order to advance the wipers 872 to 875, inclusive, an additional step in the clockwise direction into engagement with the home contact positions.

From the foregoing description of the operation of the call storage control equipment 800 it will be understood that one call from each primary line switch group may be stored in the associated call storage plunger line switch and that these calls are indicated in a sequential order in the banks of the sequence selecting switch 805 so that they may be released from storage to select available links at the operator position in the same order in which they are stored. It will also be understood that after the wipers of the sequence selecting switch 805 have been advanced step-by-step to sequentially release the stored calls, the wipers will engage the contacts 11 in order to restore the call storage control equipment 800 to normal and place it in condition to respond to a new all-links busy condition.

In conclusion, it should be noted that if only one call is stored in one of the call storage plunger line switches after an all-links busy condition has been registered therein, the sequence selecting switch 805 will operate one step to distribute the one stored call as soon as an idle link at an operator position at the switchboard becomes available. When this one stored call is distributed and the all-links busy condition is removed, the sequence selecting switch 805 will automatically and self-interruptedly advance its wipers step-by-step over the contacts 2 to 10, inclusive, into engagement with the contacts 11 in the manner previously described. Consequently, the call storage control equipment 800 will be restored to normal and prepared so that it may be reoperated in response to a further all-links busy indication.

*Operation of the system illustrated in Fig. 1C*

In the call distributing and call storage systems described above in connection with Figs. 1A and 1B, the incoming toll calls are distributed to idle links at the operator position by means of primary and secondary plunger line switches which are respectively controlled by primary and secondary master switches for the purpose of preselecting idle trunk lines. Furthermore, in the system disclosed in Fig. 1A incoming toll calls were stored in response to an all-links busy condition in an all-relay type call storage relay group (Fig. 7) and they were released for distribution to idle links without regard to the order in which the calls are initially stored. In the call storage arrangement provided in the system illustrated in Fig. 1B, which utilizes call storage plunger line switches and an associated call storage master switch (Figs. 8 and 9), the incoming toll calls are stored in the order in which they are received in each group of primary line switches and they are released from storage for distribution to idle links at the operator positions in precisely the same order in which they are stored.

The call distributing and call storage arrangement of the system illustrated in Fig. 1C comprises Figs. 2, 4, 5 and 10 and is somewhat similar to the system disclosed in Fig. 1A, except that Fig. 10 has been substituted for Figs. 3 and 6 and Fig. 7 has been omitted. More specifically, instead of utilizing secondary plunger line switches and a secondary master switch for preselecting idle links at an operator switchboard, the present system utilizes rotary type secondary line switches which operate to search for an idle link. Also, the rotary secondary line switches of Fig. 10 are arranged so that they will automatically store calls in the order in which they are received when an all-links busy condition is encountered.

Referring now to Figs. 2 and 5 of the system illustrated in Fig. 1C, it will be seen that the primary plunger line switches, such as 210, have access by way of their respective bank contacts to ten trunk lines, including the trunk line C250A, extending respectively to ten secondary rotary switches, such as the secondary rotary switch 1000, illustrated in Fig. 10. The latter switches have access by way of their wipers to trunk lines, including the trunk line C402, to links, such as the link 415, at different positions at the operator switch board in Fig. 4. Referring again to Fig. 5, it will be seen that the primary master switch 500 controls the alignment of the plunger arms of the primary plunger line switch in the associated plunger line group in the same manner as has been previously explained in connection with the operation of the systems illustrated in Figs. 1A and 1B. However, in the present system the straps 536 and 576 may be disconnected inasmuch as the conductors C701A and C702A are not required, and also because the toll calls that cannot be distributed by the secondary rotary switches to links at the operator switchboard will now be stored by the secondary rotary switches until idle links become available. However, in the primary master switch 500 (Fig. 5) the strap 575 must be added in order to provide the necessary ground potential at the contacts 573 and 574 of the master switch start relay R570. Furthermore, since the primary master switch 500 does not cooperate with secondary plunger line switches and associated secondary master switches, as illustrated in Figs. 1A and 1B, the kick-off bank and wiper 582 are not required and may be omitted.

Inasmuch as the circuits and apparatus disclosed in Figs. 2 and 5 have been described in detail in connection with the system illustrated in Fig. 1A, they will be only briefly discussed in describing the system in Fig. 1C. Thus, it will be understood that an incoming toll call received at the trunk circuit 200 (Fig. 2) will be routed to and idle one of the secondary rotary switches over a trunk line that has been preselected by the primary master switch 500. If, for example, the primary master switch 500 has preselected the trunk line C250A and has aligned the plunger arms of all of the primary line switches in the associated group with the first set of bank contacts, the negative, positive, C and EC conductors C204 to C207, inclusive, will be connected by way of the contact springs 241A to 241D, inclusive, and the conductors C251A to C251D, inclusive, in the trunk line C250A to the secondary rotary switch 1000 in Fig. 10 in response to the seizure of the primary plunger line switch 210. As soon as the plunger arm 231 of the line switch 210 is actuated to complete the above connection, ground potential through the lower winding of the relay R201 is extended by way of the contacts 202, EC conductor C207, contact springs 241D, conductor C251D in the trunk line C250A extending to Fig. 10, contacts 1035 and the winding of the line relay R1010 in the secondary rotary switch 1000, to battery. The line relay R1010 upon operating, completes, at its contacts 1011 and 1012, a circuit for the switching relay R1030 and, at its contacts 1013, it completes a circuit for the magnet M1040. The ground potential at the contacts 1011 is also returned over the conductor C251C to operate the relay R203 in the trunk circuit 200 and to hold the upper bridge cut-off winding of the relay R220 in the line switch 210 in its operated position.

The secondary rotary switch 1000 includes the wipers 1042A to 1042F, inclusive, which are controlled by the magnet M1040 to advance step-by-step over the associated contact banks to search for idle trunk lines extending to idle links at the different positions of the operator switchboard illustrated in Fig. 4. It may be assumed for the purpose of describing the present system that the wipers 1042A to 1042D, inclusive, have access to twenty five trunk lines terminating respectively in twenty five different links at the operator's switchboard. Each trunk line includes four conductors C401A to C401D, inclusive, corresponding respectively to the negative, positive, C and EC conductors. The wipers 1042E and 1042F are arranged so that they are spaced-apart 180° from the wipers 1042A to 1042D, inclusive, so that as the wipers 1042A to 1042D, inclusive, are advanced step-by-step over the twenty five contacts of the associated contact banks, the wipers 1042E and 1042F are disengaged from the contacts in their associated contact banks. When the magnet M1040 advances the wipers 1042A to 1042D, inclusive, from the twenty-fifth contact in the associated contact banks, the wipers 1042E and 1042F engage the contacts 1 in the associated contact banks. Thereafter, the last-mentioned wiper may be advanced step-by-step over the twenty-five contacts in the associated contact banks until they are stepped off the bank and the wipers 1042A to 1042D, inclusive, are stepped into engagement with the contacts 1. It should be noted at this time that the wipers 1042E and 1042F are utilized in connection with the storage of a call in the call storage control circuit 1005 whenever the wipers 1042A to 1042D, inclusive, are unable to find an idle trunk line extending to an available link at the operator switchboard.

It will be assumed that at the time the line relay R1010 operates, as previously described, the wipers 1042A to 1042D, inclusive, are in engagement with the contacts 1 terminating the trunk line C402 extending to the idle link 415 at the first operator position of the switchboard. Since the C conductor C401C in the link 415 is not grounded at this time, the magnet M1040 of the secondary rotary switch 1000 cannot operate. Consequently, a circuit is immediately completed for the switching relay R1030 which may be traced from ground at the contacts 1011 and then by way of the contacts 1012, the winding of the relay R1030, contacts 1021 and 1041 and the winding of the magnet M1040, to battery. When this circuit is completed, the relay R1030 operates, but due to the high resistance of its winding, insufficient current flows through the magnet M1040 and, consequently, the magnet does not operate.

In response to the operation of relay R1030, the grounded EC conductor C251D is extended by way of the contacts 1033, wiper 1042C, conductor C401D in the trunk line C402, to the winding of the relay R435 in the link 415. As previously described, the relay R435 completes a circuit for illuminating the lamp L460 to indicate to the operator at the first operator position that a call has been extended to the link. As soon as the call is thus extended to the link 415, the relay R445 operates to return ground potential over the C conductor C401C, the wiper 1042D, contacts 1034 and 1037, the winding of relay R1030, contacts 1021 and 1041 and the winding of the magnet M1040, to battery. In this manner, the switching relay R1030 is now locked in its operated position in series with the magnet M1040 under control of the link 415 at the first operator position. Also, the ground potential returned over the conductor C401C is returned by way of the conductor C251C to retain the primary plunger line switch 210 in its operated position and to maintain the relay R203 operated or to operate the latter relay if it is not operated. As a further result of the operation of the switching relay R1030, at its contacts 1035, it interrupts the circuit for the line relay R1010 which now restores to normal and, at its contacts 1031 and 1032, the relay R1030 now extends the negative and positive talking conductors C251A and C251B by way of the wipers 1042A and 1042B, the conductors C401A and C401B and then to the operator position equipment (not shown) so that the operator thereat may now converse with the calling party. During the time that the operator at the first position is busy handling the above call in order to further extend the connection to the desired called subscriber, the position equipment functions in a conventional manner to busy all of the remaining links at the position by grounding the respective C conductors in order to prevent any other secondary rotary switches, as the switch 1000, from selecting a link at that position. Also, the position equipment removes ground potential at the contacts 410A from the circuit for the position control relay R1050. The latter relay is normally maintained in its operated position as long as one of the positions of the switchboard is available to handle a call through one of the links thereat. Consequently, the relay R1050 will not restore to normal until all of the operator positions of the switchboard are busy.

When the operator at the first position answers the above described call, the relay R450 operates in a conventional manner to open its contacts 452 and extinguish the lamp L460 and to prepare, at its contacts 453, an alternate circuit for again illuminating the lamp in response to a recall signal or a release signal transmitted over the EC conductor C401D to restore the relay R435.

When the connection is released at the calling end, the relay R435 will restore to normal and complete a circuit, including the contacts 437 and 453, in order to illuminate the lamp L460 and indicate to the operator that the call through the associated link has been released. The operator may release the link 415 in a conventional manner thereby to restore the relay R445 and remove the holding ground potential from the C conductor C401C. In the secondary rotary switch 1000, the removal of ground potential from the conductor C401C will cause the switching relay R1030 to restore to normal and render the secondary rotary switch 1000 available for distributing another toll call to an idle link at one of the operator positions. As a further result of the removal of ground potential from the conductor C401C, the holding ground potential is simultaneously removed from the conductor C251C, thereby to interrupt the locking circuit for the upper bridge cut-off winding of the primary plunger line switch 210 and to interrupt the circuit for the relay R203 in the trunk circuit 200. Incident to the restoration of the relay R220, the plunger arm 231 is withdrawn from the first set of contact springs and is automatically realigned by the master switch shaft of the primary master switch 500 with the set of contacts in the associated bank that is preselected by the master switch 500. Also, the bridge cut-off arm 232 of the line switch 210 restores to normal to prepare, at its contacts 221, the circuit for the line relay R215. The trunk circuit 200 and the primary plunger line switch 210 are now in condition to receive an additional toll call.

In the foregoing description of the operation of the secondary rotary switch 1000, it was assumed that the trunk line engaged by the wiper 1042A to 1042D, inclusive, was available at the time the line relay R1010 operated. It will now be assumed that this trunk line is busy at the time the line relay R1010 operates and, consequently, ground potential will be applied by way of the C conductor C401C, wiper 1042D, contacts 1036, 1013, 1021 and 1041 and the winding of the magnet M1040, to battery. When the ground potential is encountered by the wiper 1042D, the previously traced energizing circuit for the switching relay R1030 is short-circuited to prevent its operation. This short-circuit may be traced from ground at contacts 1011 and then by way of the contacts 1012, the winding of relay R1030, contacts 1013 and 1036 and the grounded wiper 1042D. At this time, the magnet M1040 operates and immediately interrupts its operating circuit at its contacts 1041. Upon restoring, the magnet M1040 advances its wipers 1042A to 1042D, inclussive, one step in a clockwise direction into engagement with the contacts 2. If the second contact engaged by the wiper 1042D is also grounded to indicate that the trunk line terminating in the contacts 2 is also busy, an additional circuit will be completed for the magnet M1040 to advance the wipers into engagement with the third set of bank contacts. The above cycle of operation will be recompleted each time a grounded contact is encountered by the wiper 1042. However, when an ungrounded contact is encountered the switching relay R1030 will not be short-circuited and it will operate in series with the magnet M1040, as previously described, in order to seize the selected trunk line and to extend the toll call to an available link at one of the positions of the switchboard.

In order to describe the storage of a call in the call storage control circuit 1005, it will be assumed that at the time the line relay R1010 in the secondary rotary switch 1000 is operated in response to a toll call distributed thereto, all of the links terminating the twenty-five trunk lines accessible to the wipers 1024A to 1042D, inclusive, are busy. In other words, the operators at the different operator positions are busy handling calls received on links at the respective positions and ground potential is returned over the C conductors of the various links to mark the said links busy in the banks of the secondary rotary switch 1000. When this condition exists, the ground potential at the contacts 410A at the first operator position, the ground potential at the contact 410B at the last operator position and the ground potential at the corresponding contacts of the intermediate operator positions (not shown) is removed from the operating circuit for the position control relay R1050 in order to restore the latter relay. When the relay R1050 restores to normal, it prepares at its contacts 1051, a point in the circuit for operating the first call storage relay R1055 from the last or twenty-fifth contact accessible to the wiper 1042F of the secondary rotary switch 1000 and multipled to corresponding contacts and wipers of the remaining secondary rotary switches.

With the call storage control circuit 1005 in the condition noted above and assuming that the call received in the secondary rotary switch 1000 is the first call received after the all-links busy condition occurs, then the operation of the relay R1010 will cause the magnet M1040 to be self-interruptedly operated over the previously traced circuit until the wipers 1042A to 1042D have stepped off the twenty-fifth contact in the associated contact banks. This self-interrupting circuit for the magnet M1040 includes the ground potential on the bank contacts engaged by the wiper 1042D as it is advanced step-by-step over the contacts 1 to 25, contacts 1036, 1013, 1021 and 1041 and the winding of the magnet M1040, to battery. When the wiper 1042D is stepped off its twenty-fifth bank contact, the wipers 1042E and 1042F then engage the first contacts in the associated contact banks. At this point it should be noted that the twenty five contacts which are now accessible to the wiper 1042E are connected to ground potential so that the above traced self-interrupting circuit for the magnet M1040 will again be completed as the wiper 1042E advances step-by-step over the contacts 1 to 25, inclusive. As the wiper 1042E advances over the above noted contacts under control of the magnet M1040, the wiper 1042F is also advancing over corresponding contacts in an attempt to complete a circuit for the storage relay R1020 and one of the call storage control relays, such as the relay R1055. It may be well to mention at this time that the relays R1055, R1065, R1070 and R1075 are arranged so that they may be sequentially connected to the respective, twenty-fifth, twenty-fourth, twenty-third and twenty-second bank contacts, such as the bank contact accessible to the wiper 1042F, in each of the corresponding bank contacts in each of the secondary rotary switches, such as the switch 1000. Consequently, the wipers 1042E and 1042F will be advanced step-by-step over the contacts 1 to 25, inclusive, without completing the above mentioned test circuit for the storage relay R1020. However, as soon as the wiper 1042F engages the contact 25, a circuit is completed from ground by way of the winding of the storage relay R1020, wiper 1042F and the engaged contact 25, contacts 1051 of the restored position control relay R1050 and the winding of the first storage relay R1055, to battery. The relay R1020 immediately operates over this circuit to interrupt, at its contacts 1021, the previously mentioned circuit including the wiper 1042E for self-interruptedly controlling the magnet M1040, thereby to terminate further stepping of the wipers of the rotary switch 1000. As soon as the first storage relay R1055 operates, it completes, at its contacts 1057, an obvious circuit for operating the delay relay R1060 and, at its contacts 1056, it completes an obvious circuit for illuminating the lamp L1081 in order to indicate to the operators at the different positions of the switchboard that one call has been placed in storage and requires the attention of one of the operators. Thus, the first toll call has been stored in the secondary rotary switch 1000 under control of the first storage relay R1055 and the delay relay R1060 upon operating prepares, at its contacts 1061, a point in the circuit for storing a second received toll call in the second storage relay R1065.

If a second toll call is now received and distributed to one of the remaining secondary rotary switches, such as the switch 1000A, the secondary rotary switch thereat will operate in the manner described above until the wiper, corresponding to the wiper 1042F, encounters the battery potential on the twenty-fourth bank contact through the winding of the second storage relay R1065. When this occurs, the call storage relay R1065 will operate in series with the storage relay in the secondary rotary switch 1000A, corresponding to the relay R1020, in order to prevent further stepping of the wipers of that switch. The second call storage relay R1065, upon operating connects, at its contacts 1067, the third call storage relay R1070 to the twenty-third bank contact accessible to the wiper of the secondary rotary switches, corresponding to the wiper 1042F, so that the next incoming toll call received by one of the rotary switches will be stored in the twenty-third bank contact and will cause the operation of the third call storage relay R1070 in the manner described above. Operation of the second call storage relay R1065 completes, at its contacts 1066, the circuit for illuminating the second call storage lamp L1082 and operation of the third call storage relay R1070 will complete, at its contacts 1071, a circuit for the third call storage lamp L1083 in order to indicate to the operators at the switchboard that a second and a third call has been stored. As soon as the third relay R1070 operates it prepares, at its contacts 1072, a point in the circuit for connecting the fourth call storage relay R1075 to the twenty-second bank contacts of all of the secondary rotary switches so that a fourth toll call received on one of the secondary rotary switches will be stored with the wiper, corresponding to the wiper 1042F, in engagement with the twenty-second bank contact and the fourth call storage relay R1075 will operate to illuminate the fourth call storage lamp L1084.

In Fig. 10, four call storage relays R1055, R1065, R1070 and R1075 have been illustrated for the purpose of storing four toll calls on the respective twenty-fifth, twenty-fourth, twenty-third and twenty-second bank contacts of four secondary rotary switches in the exact order in which these toll calls are received by such switches. It should be understood, however, that the number of call storage relays, such as the relay R1055, required for the purpose of storing calls will necessarily be determined by the amount of traffic in the particular system utilizing the call storage facilities and the number of links at the operator positions for handling such traffic. In any event it will be understood from the above description of the operation of the secondary rotary switch 1000 and the call storage control circuit 1005, that the calls are stored in the order received and they will be removed from storage in the same order as soon as links become available at one or more of the operator positions as will now be described.

If, for example, the operator at the first operator position 410 is available to again handle toll calls at her position, the position equipment will automatically operate to replace ground potential, at the contacts 410A for re-operating the position control relay R1050. As soon as the relay R1050 operates, it interrupts, at its contacts 1051, the circuit for the relay R1055 which slowly restores to normal and it interrupts the circuit for the storage relay R1020 in the secondary rotary switch 1000. The relay R1020 immediately restores to normal, whereupon, the magnet M1040 is operated over the previously described circuit from ground potential at the contacts 25 engaged by the wiper 1042E. The magnet M1040 operates and restores in the manner described above, thereby to advance the wipers 1042E and 1042F from the twenty-fifth bank contact and simultaneously thereat, the wipers 1042A to 1042D, inclusive, are advanced into engagement with the first contacts in the associated contact banks. The secondary rotary switch 1000 now operates in the manner previously described to search for a trunk line extending to an idle link at the first operator position. The idle links, at the first operator position, are indicated by an absence of ground on the C conductors, such as the conductor C401C, terminating in the bank contacts accessible to the wiper 1042D. When the wipers of the secondary rotary switch 1000 engage an idle trunk line terminating in an idle link at the first operator position, the switch relay R1030 operates to prevent further stepping of the switch wipers and it switches the connection through to the link at the operator position in the manner previously described.

From the foregoing description, it will be appreciated that the secondary rotary switch 1000 has vacated its first call storage position so that each of the remaining stored calls can move up one step in the order of storage so that the second stored call will become the first stored call for distribution and the third and fourth stored calls will become the second and third. More specifically, the restoration of the slow-to-release relay R1055 interrupts, at its contacts 1057, the circuit for the slow-to-release delay relay R1060 and the latter relay, upon restoring, interrupts, at its contacts 1061, the series circuit for the second call storage relay R1065 and the storage relay in the secondary rotary switch 1000A, corresponding to the relay R1020. Further operation of the secondary rotary switch 1000A will be determined by the condition of the position control relay R1050. If the distribution of the first stored call on the secondary rotary switch 1000 to one of the links at the first operator position causes the position equipment thereat to again remove ground potential at the contacts 410A, the position control relay R1050 will again restore to normal to reconnect the first storage relay R1055 to the twenty-fifth bank contacts of all of the secondary rotary switches. If this condition is assumed, the restoration of the storage relay, corresponding to the relay R1020, in the secondary rotary switch 1000A will complete the circuit for the magnet, corresponding to the magnet M1040, so that the wipers will be advanced from the contacts 24 to the contacts 25. However, as soon as the contact 25 is engaged by the wiper, corresponding to the wiper 1042F, the storage relay will reoperate in series with the first call storage relay R1055 thereby moving the second stored call from the twenty-fourth contact to the first stored call position 25 in the associated contact banks. When the second call storage relay R1065 restore to normal to permit the rotary switch 1000A to move to the first call storage position, it interrupted the circuit for the third call storage relay R1070 to permit the secondary rotary switch storing the third call to move to the twenty-fourth contact position corresponding to the second call storage position. The same advancement of the call storage position of the fourth stored call will occur incident to the restoration of relay R1075.

Returning again to the reoperation of the first call storage relay R1055, in response to the transfer of the second stored call to the first storage position, it will be seen that the chain circuit including the cyclic operation of relays R1055, R1060, etc., will be recompleted as each stored call is moved up in order one storage position.

From the foregoing description, it will be appreciated that as soon as the link becomes available at an operator position, the first stored call will be released for distribution and if the distribution of the released call again establishes an all-links busy condition, the remaining stored calls will move up one call storage position. However, if the all-links busy condition is not re-established by the distribution of the first stored call to an idle link, then the position control relay R1050 will remain in its operated position to permit the second stored call to skip the first called storage position and be distributed to an idle link. The third and fourth stored call will move up to the first and second call storage positions if the all-links busy condition is re-established by the restoration of the position control relay R1050 in response to the distribution of both the first and second previously stored calls. Under certain conditions, all four stored calls may be distributed one after another, due to the fact that the position control relay R1050 is maintained in its operated position to indicate that links are available at the positions of the switchboard. It should be noted that as the calls move up in their positions of storage, the illuminated condition of the lamps L1081 to L1084, inclusive, will always indicate to the operators at the switchboard, the number of calls still remaining in storage.

In the above description of the operation of call distributing and call storage apparatus shown in Figs. 2, 4, 5 and 10, combined in the manner illustrated in Fig. 1C, it has been assumed that four toll calls may be stored in the call storage control circuit 1005. As a result of the storing of the four calls noted, the relays R1055, R1065, R1070 and R1075 are in their operated positions. Incident to the operation of the fourth call storage relay R1075 to store the fourth toll call, battery potential is connected through the resistor 1078 and the contacts 1077 to the contact 21 in the banks accessible to the storage test wiper, corresponding to the wiper 1042F, of all of the secondary rotary switches. If additional calls are now distributed by the primary plunger line switches (Fig. 2) to any of the secondary rotary switches, the wipers of said secondary switches will automatically rotate in the manner previously described until the storage test wiper, corresponding to the wiper 1042F, engages its bank contact 21. When this occurs a circuit will be completed for operating the associated storage relay, corresponding to the relay R1020, in order to terminate further rotation of the wipers of the associated secondary rotary switch. With this arrangement, several secondary rotary switches having toll calls thereon may be locked to the bank contact 21 whenever four toll calls have been stored in the call storage control circuit 1005. The above arrangement for locking the additional calls on the twenty-first contact of the associated contact banks is provided to prevent such secondary rotary switches from continuously rotating the associated wipers in attempting to find either an idle trunk line extending to an idle link or one of the call storage positions in the associated banks.

In the event that a toll call is received by the secondary rotary switch 1000, at a time when four calls have been stored in the call storage control circuit 1005 and at a time when all of the available links at the operator position are busy, the magnet M1040 thereof will be self-interruptedly operated in the manner previously described until its wiper 1042F engages the contact 21. When this occurs, the battery potential applied thereto, through the contacts 1077, will complete an operating circuit for the storage relay R1020. The relay R1020 upon operating interrupts, at its contacts 1021, the stepping circuit for the magnet M1040 thereby to arrest the stepping action of the associated wipers. Other secondary rotary switches having toll calls thereon will also operate in the manner described above to connect with the contact 21 in the associated contact bank. All calls received after the storage of a fourth toll call in the toll storage control circuit 1005 will be stored in this manner.

When the links at the operator position become available and cause the distribution of the stored calls in the control circuit 1005 in the order stored, the fourth or last call storage relay R1075 will subsequently restore to normal. Accordingly, if only one stored call is removed from the control circuit 1005 and all of the links thereafter become busy, the second, third and fourth stored calls will move up into storage positions 1, 2 or 3, as previously described. This will leave the fourth call storage position vacant to receive one additional call for storage. Consequently, the restoration of the fourth call storage relay R1075 to permit the transfer of the fourth call stored call to the third call storage position in the manner previously described will also interrupt, at its contacts 1077, the previously described circuit for the storage relay R1020 in the secondary rotary switch 1000 and all of the corresponding relays in the secondary rotary switches engaging the corresponding contacts 21. The rotary switch 1000 and all of the remaining rotary switches connected to the contacts 21 will now begin the automatic advancement of their associated wipers. As soon as the storage relay R1020 completes the operating circuit for the magnet M1040, the magnet operates and restores to normal to advance its wipers an additional step into engagement with the contacts 22. If the switch 1000 is the first switch to engage the contacts 22, the storage relay R1020 will immediately reoperate over a circuit including its wiper 1042F, the engaged contact 22, the contacts 1072 and the winding of the fourth storage relay R1075. Thus, the call stored on the secondary rotary switch 1000 will now assume its position in the call storage control circuit as the fourth stored toll call. The relay R1075 upon operating, again applies the resistance battery potential by way of its contacts 1077 to the contacts 21 of all the secondary rotary switches. The secondary rotary switches that have automatically advanced their wipers from the contacts 21 in attempting to find a called storage position, will now continue to rotate their wipers in the manner previously described until the wipers, corresponding to wiper 1042F, again engage the contacts 21. In this manner the calls that are held in position 21 of the secondary rotary switch bank will attempt to align themselves in the storage chain whenever one of the storage positions becomes available.

When the calls stored in position 21 of the secondary rotary switch bank contacts, engaged by the wipers corresponding to the wiper 1042F, are released therefrom by the restoration of the fourth call storage relay R1075, they will pass over the contacts 22, 23, 24 and 25 if calls are stored in these positions. Each time one of the storage contact positions is reached, two storage relays, such as the relay R1020, will be connected in multiple to one of the call storage relays, such as the relay R1055. Due to the marginal characteristics of the relay R1020 and the corresponding relays in each of the secondary rotary switches, only one of such relays will operate in series with one of the call storage relays, such as R1055. When a second storage relay is connected in multiple with a first storage relay to the winding of one of the call storage relays, the second storage relay, corresponding to the relay R1020, cannot operate. Accordingly, this prevents two or more calls on secondary rotary switches from being stored in the same call storage position of the call storage control circuit 1005.

While three embodiments of the invention have been disclosed by combining the different figures of drawings in accordance with Figs. 1A, 1B and 1C, it will be understood that various modifications may be made therein which are within the true spirit and scope of the present invention.

What is claimed is:

1. In a telephone system, a plurality of plunger line switches, incoming lines terminating respectively in said line switches, trunk lines selectable by all of said line switches, a master switch common to said line switches normally operated automatically to preselect an idle one of said trunk lines for use by any one of said line switches, a call storage unit, means in said call storage unit operated responsive to an all trunks busy condition of said trunk lines to prepare said unit to store a call received thereafter by one of said line switches, means controlled in response to a call received over one of said incoming lines by one of said line switches for controlling said call storage unit to store said call, and means in said storage unit controlled in response to the removal of said all trunks busy condition for releasing said one call from said storage unit and for controlling said master switch to preselect an idle one of said trunk lines and for controlling said one line switch to select said preselected trunk line in order to extend said call received over said one incoming line by way of said one line switch to said preselected trunk line.

2. In a telephone system, a plurality of trunk lines, a plurality of line switches for establishing connections with any one of said trunk lines, a reciprocating master switch normally operated to preselect idle ones of said trunk lines one at a time for use by said line switches, a storage unit, means in said storage unit controlled responsive to an all trunks busy condition for terminating reciprocating movement of said master switch and for preparing said unit for operation to store a call received by any line switch, means in said storage unit operated responsive to a call received by any line switch for preventing said line switch from establishing a connection with any trunk line and for storing said call, means in said storage unit controlled in response to one of said trunk lines becoming idle for removing said all trunks busy condition and for controlling said master switch to preselect said one idle trunk line and for controlling said line switch having said stored call to select said preselected trunk line, and means for reestablishing said all trunks busy condition responsive to said last-mentioned selection of said preselected trunk line in order to store additional calls.

3. In a telephone system, a plunger line switch, a group of trunk lines, said line switch having access to said group of trunk lines, a master switch automatically operated to preselect an idle one of said trunk lines for use by said line switch, a call storage unit, a line relay in said line switch operated responsive to a received call, a normally effective control circuit including said master switch and said storage unit for operating said switch to select said preselected trunk line in response to said operation of said line relay, means in said call storage unit controlled in response to an all trunk lines busy condition for rendering said control circuit ineffective and for preventing said master switch from preselecting one of said trunk lines, thereby to store a call received by said line relay, and means in said call storage unit controlled in response to removal of said all trunk lines busy condition for selectively controlling said master switch to preselect an idle one of said trunk lines and for thereafter selectively rendering said control circuit effective, thereby to permit said switch to select said preselected idle trunk line.

4. In a telephone system, a plunger line switch, a group of trunk lines, said line switch having access to said group of trunk lines, a master switch automatically operated to preselect an idle one of said trunk lines for use by said line switch, a plurality of operator positions, a plurality of links at each of said positions, a call storage unit operatively interconnected with said master switch, a line relay in said line switch operated responsive to a received call, a normally effective control circuit including said master switch and said storage unit for operating said line switch to select said preselected trunk line in response to said operation of said line relay, means controlled over said selected trunk line for seizing an idle link at one of said positions and for artificially marking busy all of the links at said one position, means in said call storage unit controlled in response to an all links busy marking of said links at each of said positions for rendering said control circuit ineffective and for preventing said master switch from preselecting one of said trunk lines, thereby to store a call received by said line relay, and means in said call storage unit controlled in response to removal of said all links busy marking condition from the links at any one of said positions for selectively controlling said master switch to preselect an idle trunk line and for thereafter rendering said control circuit effective to operate said switch to select said preselected trunk line in order to extend said call on said line relay to one of the idle links at the position at which said all links busy marking condition is removed.

5. In a telephone system, a plurality of groups of plunger line switches, corresponding groups of trunk lines accessible respectively to said line switches in said groups, a master switch for each group of line switches, each of said master switches automatically operated to preselect an idle trunk line in the associated group of trunk lines for use by any line switch in the associated group of line switches, a plurality of operator positions, a plurality of links at each of said positions, means responsive to a call on a line switch for operating said line switch to select the preselected trunk line in the associated group of trunk lines, means controlled over said selected trunk line for seizing an idle link at one of said positions and for artificially marking all of the links at said one position busy, a call storage unit common to said master switches, means controlled responsive to the marking busy of all of said links at each of said operator positions for registering said all links busy condition in said storage unit, all links busy means in said storage unit individual to each of said master switches operated in response to said all links busy registration for preventing the associated master switch from operating to preselect an idle trunk line and for preventing a line switch having a call thereon from selecting one of said trunk lines, means in said call storage unit controlled in response to the removal of said all links busy marking at one of said positions for removing said all links busy registration from said call storage unit, means in said call storage unit thereafter effective for controlling said all links busy means one at a time until said all links busy condition is again registered in order to permit the associated master switch to operate to preselect an idle trunk line and to permit the line switch in the associated group having a call thereon to operate and select said preselected trunk line, thereby to extend said call on the said line switch to one of the idle links at the operator position at which said all links busy marking is removed.

6. In a telephone system, a plurality of groups of plunger line switches, incoming lines terminating respectively in each of said line switches, a plurality of groups of trunk lines, said groups of trunk lines corresponding respectively to said groups of plunger line switches and each of the trunk lines in each of said groups being accessible to each of the line switches in the associated group of line switches, a master switch for each group of line switches automatically operated to preselect an idle one of said trunk lines in the associated group of trunk lines for use by any line switch in the associated group of line switches, a call storage unit common to said master switches operated responsive to an all trunks busy condition in each of said groups of trunk lines to store a call received thereafter by a line switch in one or more of said groups of line switches, means controlled in response to call received by a line switch in one or more of said groups of line switches over the associated incoming line for controlling said call storage unit to store said call, whereby at least one call on a line switch may be stored in said storage unit from each of said groups of line switches, and means in said storage unit controlled in response to the removal of said all trunks busy condition from each of said groups of trunk lines for controlling said master switches one at a time to preselect an idle one of said trunk lines in the associated group of trunk lines in order to release a call from storage and for controlling the line switch in the associated group of line switches to select the trunk line in the associated group of trunk lines preselected by the associated master switch, thereby to extend said stored call received over one of said incoming lines by way of the associated line switch to the preselected trunk line in the associated group of trunk lines.

7. In a telephone system, an operator position, a plurality of links at said position, a plurality of secondary line switches having access to said links, a secondary master switch common to said secondary line switches operative to preselect an idle one of said links for use by said secondary line switches, a plurality of primary line switches having access to said secondary line switches, a primary master switch common to said primary line switches operative to preselect an idle one of said secondary line switches for use by said primary line switches, a call storage unit associated with said primary master switch, means controlled in response to an all links busy condition for preventing said secondary master switch from preselecting one of said links and for preventing said primary master switch from preselecting one of said secondary line switches and for rendering said call storage unit effective to store a call, means controlled in response to a call received by one of said primary line switches for operating said storage unit to store said call, means controlled responsive to the removal of said all links busy condition for rendering said primary master switch and said secondary master switch operative respectively to preselect an idle secondary line switch and an idle link and for releasing said stored call from said storage unit, means in said one primary line switch controlled in response to said release of said call thereon from storage for operating said one primary line switch to select said one secondary line switch preselected by said primary master switch, and means in said one secondary line switch controlled in response to said selection thereof by said one primary line switch for operating said one secondary line switch to select said one link preselected by said secondary master switch, thereby to route said stored call from said one primary line switch by way of said one secondary line switch to said one link at said operator position to be answered.

8. In a telephone system, an operator position, a plurality of links at said position, a plurality of secondary line switches having access to said links, a secondary master switch common to said secondary line switches automatically operated to preselect an idle one of said links for use by any one of said secondary line switches, trunk lines terminating respectively in said secondary line switches, a plurality of primary line switches having access to said trunk lines, a primary master switch common to said primary line switches automatically operated to preselect one of said trunk lines for use by any one of said primary line switches, means responsive to a call on any one of said primary line switches for operating said one line switch to select said preselected trunk line and for thereafter operating the secondary line switch terminating said preselected trunk line to select said preselected link in order to extend said call to said operator position to be answered, means at said operator position for marking all of said links busy responsive to said selection of said one link, a call storage unit associated with said primary master switch, means controlled by said all links busy condition for preventing said secondary master switch from preselecting a link and for registering said all links busy condition in said call storage unit, means controlled responsive to said registration of said all links busy condition in said call storage unit for preventing said primary master switch from preselecting a trunk line and for storing a call received on any primary line switch, means controlled responsive to the removal of said all links busy condition at said operator position for controlling said secondary master switch to preselect an idle link and for controlling said storage unit, and means in said call storage unit governed in accordance with said last-mentioned control for selectively controlling said primary master switch to preselect an idle trunk line and for thereafter operating said primary line switch having said stored call to route said call by way of said preselected trunk line and an associated secondary line switch to said preselected link.

9. In a telephone system, two groups of line switches, two groups of trunk lines accessible respectively to said two groups of line switches, a master switch for each group of line switches, each of said master switches independently operated to preselect an idle trunk line in the associated group of trunk lines for use by any line switch in the associated group of line switches, a plurality of operator positions, a plurality of links at each of said positions, a call storage unit common to said master switches operated responsive to an all links busy condition at each of said operator positions, an all links busy relay in said call storage unit individual to each of said master switches controlled in response to said operation of said call storage unit for simultaneously preventing said master switches from operating to preselect idle trunk lines, a control relay in said storage unit for each group of line switches independently operated in response to a call on a line switch in the associated group for preventing said line switch from selecting a trunk line and for storing said call, whereby at least one call received on a line switch in each of said group of line switches may be independently stored by said storage unit, control means in said storage unit for selecting said all links busy relays one after another, means controlled responsive to the removal of said all links busy condition at each of said operator positions for initiating operation of said control means, means controlled in response to said selection of each of said all links busy relays for controlling the associated master switch to preselect an idle trunk line in the associated group of trunk lines and for restoring the associated control relay to initiate the operation of the line switch in the associated group of line switches having said stored call thereon to select said preselected trunk line in the associated group of trunk lines, and means controlled over said selected trunk lines for extending one of said stored calls to an idle link at one of said operator positions to be answered and for extending the other of said stored calls to an idle link at another of said operator positions to be answered.

10. In a telephone system, two groups of line switches, two groups of trunk lines accessible respectively to said two groups of lines switches, a master switch for each group of line switches, each of said master switches independently operated to preselect an idle trunk line in the associated group of trunk lines for use by any line switch in the associated group of line switches, a plurality of operator positions, a plurality of links at each of said positions, a call storage unit common to said master switches operated in response to a simultaneous all links busy condition at said operator positions, an all links busy relay in said storage unit individual to each of said master switches operated in response to said operation of said call storage unit for simultaneously preventing said master switches from operating to preselect idle trunk lines and for conditioning said call storage unit to store at least one call received on a line switch in each group of line switches, two control relays in said storage unit corresponding respectively to said two master switches, means controlled in response to a call on a line switch in one of said groups of line switches for operating the one of said control relays corresponding to the associated master switch and controlled in response to a call on a line switch in the other of said groups of line switches for operating the other of said control relays, whereby said call storage unit is operated to store at least one call in each of said line switch groups, control means in said call storage unit selectively controllable in accordance with said operation of said control relays, means controlled in response to the removal of said all links busy condition at one or more of said operator positions for initiating operation of said control means, means including said control means for restoring said all links busy relays and said control relays in a predetermined order so that the associated master switch is permitted to operate to preselect an idle trunk line and the line switch in the associated group of line switches having the call thereon is permitted to select the preselected trunk line in the associated group of trunk lines in the same order, and means controlled responsive to the selection of said preselected trunks for extending said stored calls to idle links at said operator positions to be answered in the same order of restoration of said all links busy relays.

11. In a telephone system, a plurality of groups of trunk lines, corresponding groups of line switches, each of said line switches having access to trunk lines in the associated group, a plurality of operator positions, a plurality of links common to each of said positions, said links at each of said positions being accessible to line switches in each of said groups of line switches over the trunk lines in the associated groups of trunk lines, a master switch for each group of line switches, each of said master switches automatically operated to preselect an idle trunk line in the associated group of trunk lines, means responsive to a call on a line switch for operating said line switch to select the trunk line in the associated group of trunk lines that is preselected by the associated master switch, means controlled over the selected trunk line for seizing an idle link at one of said poistions, means at said position for artificially marking busy all of said links at said position, a call storage unit common to said master switches, means controlled responsive to the busy marking of all of said links at each of said operator positions for operating said storage unit to store a subsequent call received by one of the line switches in the group associated with each of said master switches, whereby at least one call may be stored in said storage unit from each group of line switches, means in said storage unit operated to store said calls one after another as they are received, a counting relay chain in said storage unit, means controlled responsive to the removal of said all links busy marking condition for initiating operation of said counting relay chain, and means controlled by said operation of said counting relay chain for releasing said calls from said storage unit one after another so that one line switch in each of said groups of line switches is released from storage and operated in a predetermined order to route the call thereon by way of a preselected trunk line to an idle link at an operator position.

12. In a telephone system, a plurality of groups of plunger line switches, corresponding groups of trunk lines accessible respectively to said line switches in said groups, a master switch for each group of line switches, each of said master switches automatically operated to preselect an idle trunk line in the associated group of trunk lines for use by any line switch in the associated group of line switches, a plurality of operator positions, a plurality of links at each of said positions, means responsive to a call on a line switch for operating said line switch to select the preselected trunk line in the associated group of trunk lines, means controlled over said selected trunk line for seizing an idle link at one of said positions and for artificially marking all of the links at said one position busy, a call storage unit common to said master switches, means controlled responsive to the marking busy of all of said links at each of said operator positions for registering said all links busy condition in said storage unit, all links busy relays in said storage unit individual corresponding to each of said master switches operated in response to said all links busy registration for preventing the associated master switches from operating to preselect idle trunk lines and for preventing line switches having calls thereon from selecting said trunk lines in order to store said calls in said storage unit, means in said call storage unit controlled in response to the removal of said all links busy marking at one of said positions for removing said all links busy registration from said call storage unit, a chain of relays in said call storage unit thereafter operated to control said all links busy relays in a predetermined order one at a time in order to permit the associated master switches to operate one at a time to preselect an idle trunk line and to control a line switch in the each of the associated groups of line switches having a call thereon to operate and select a preselected trunk line in said predetermined order, thereby to extend said stored calls on the said line switches to idle links at the operator positions.

13. In a telephone system, a plurality of groups of plunger line switches, incoming lines terminating respectively in each of said line switches, a plurality of groups of trunk lines, said groups of trunk lines corresponding respectively to said groups of plunger line switches and each of the trunk lines in each of said groups of trunk lines being accessible to each of the line switches in the associated group of line switches, a master switch for each group of line switches automatically operated to preselect an idle one of said trunk lines in the associated group of trunk lines for use by any line switch in the associated group of line switches, a call storage unit common to said master switches operated responsive to an all trunks busy condition in each of said groups of trunk lines to store a call received thereafter by a line switch in each of said groups of line switches, means controlled in response to call received by a line switch in each of said groups of line switches over the associated incoming line for controlling said call storage unit to store said calls, whereby at least one call on a line switch in each of said groups of line switches may be stored in said storage unit, a pair of counting relays in said storage unit individual to each of said master switches, means in said storage unit controlled in response to the removal of said all trunks busy condition from each of said groups of trunk lines for operating said pairs of counting relays one after another to control said master switches in a predetermined order one at a time to preselect an idle one of said trunk lines in the associated group of trunk lines in order to release said calls from storage, and means controlled by said master switches for controlling the line switch in the associated group of line switches to select the trunk line in the associated group of trunk lines preselected by the associated master switch, thereby to extend said stored calls received over said incoming lines by way of the associated line switches to the preselected trunk lines in the associated groups of trunk lines.

14. In a telephone system, two groups of line switches, two groups of trunk lines accessible respectively to said two groups of line switches, a master switch for each group of line switches, each of said master switches independently operated to preselect an idle trunk line in the associated group of trunk lines for use by any line switch in the associated group of line switches, a plurality of operator positions, a plurality of links at each of said positions, a call storage unit common to said master switches operated responsive to an all links busy condition at each of said operator positions, an all links busy relay in said call storage unit individual to each of said master switches controlled in response to said operation of said call storage unit for simultaneously preventing said master switches from operating to preselect idle trunk lines, a control relay in said storage unit for each group of line switches independently operated in response to a call on a line switch in the associated group for preventing said line switch from selecting a trunk line and for storing said call, whereby at least one call received on a line switch in each of said group of line switches may be independently stored by said storage unit, a relay counting chain in said storage unit for selecting said all links busy relays one after another, means controlled responsive to the removal of said all links busy condition at each of said operator positions for initiating operation of said relay counting chain, means controlled in response to said selection of each of said all links busy relays by said relay counting chain for controlling the associated master switch to preselect an idle trunk line in the associated group of trunk lines and for restoring the associated control relay to initiate the operation of the line switch in the associated group of line switches having said stored call thereon to select said preselected trunk line in the associated group of trunk lines, and means controlled over said selected trunk lines for extending one of said stored calls to an idle link at one of said operator positions to be answered and for extending the other of said stored calls to an idle link at another of said operator positions to be answered.

15. In a telephone system, a plurality of groups of line switches, a corresponding plurality of groups of trunk lines accessible respectively to said groups of line switches, a master switch for each group of line switches, each of said master switches independently operated to preselect an idle trunk line in the associated group of trunk lines for use by any line switch in the associated group of line switches, a plurality of operator positions, a plurality of links at each of said positions, a call storage unit common to said master switches operated in response to a simultaneous all-links busy condition at said operator positions, an all-links busy relay in said storage unit individual to each of said master switches operated in response to said operation of said call storage unit for simultaneously preventing said master switches from operating to preselect idle trunk lines and for conditioning said call storage unit to store at least one call received on a line switch in each group of line switches, a plurality of control relays in said storage unit corresponding respectively to said plurality of master switches, means controlled in response to a call on a line switch in each of said groups of line switches for operating the said control relays corresponding to the associated master switches, whereby said call storage unit is operated to store at least one call in each of said line switch groups, control means in said call storage unit selectively controllable in accordance with said operation of said control relays, means controlled in response to the removal of said all links busy condition at one or more of said operator positions for initiating operation of said control means, a relay counting chain selectively controlled by said control means for restoring said all links busy relays and said control relays in a predetermined order so that the associated master switches operate to preselect idle trunk lines and the line switch in the associated groups of line switches having a call thereon operates to select the preselected trunk line in the associated group of trunk lines in the same order, and means controlled responsive to the selection of said preselected trunk lines for extending said stored calls to idle links at said operator positions to be answered in the same order of restoration of said all links busy relays.

16. In a telephone system, a plurality of groups of trunk lines, corresponding groups of primary line switches, each of said primary line switches having access to trunk lines in the associated group, a plurality of operator positions, a group of links at each of said positions, said group of links at each of said positions being accessible to primary line switches in each of said groups of primary line switches over the trunk lines in the associated group of trunk lines, a primary master switch for each group of primary line switches, each of said primary master switches automatically operated to preselect an idle trunk line in the associated group, means responsive to a call on a primary line switch for operating said primary line switch to select the trunk line in the associated group of trunk lines preselected by the associated primary master switch, means controlled over the selected trunk line for seizing an idle link at one of said positions, means at said position for artificially marking busy all of said links in said group at said position, a call storage unit common to said primary master switches, means controlled responsive to the busy marking of all of said links at each of said operator positions for operating said storage unit to store a subsequent call received by one of the primary line switches in the group associated with each of said primary master switches, whereby at least one call may be stored in said storage unit from each group of primary line switches, storage plunger line switches in said storage unit operated to store said calls one after another as they are received, a storage master switch common to said storage plunger line switches, a sequence selecting switch in said call storage unit, means controlled by said storage master switch for connecting said storage plunger line switches to said sequence selecting switch in the order said storage plunger line switches are operated to store calls, means controlled responsive to the removal of said all links busy marking condition for initiating operation of said sequence selecting switch, means controlled by said operation of said sequence selecting switch for releasing said storage plunger line switches in the same order that said calls are stored therein, and means controlled by said release of said storage plunger line switches for operating said primary line switches having calls stored thereon in the same order that the calls thereon are received to route said calls thereon one after another to idle links at said operator positions.

17. In a telephone system, a plurality of groups of primary plunger line switches, corresponding groups of trunk lines accessible respectively to said primary line switches in said groups, a primary master switch for each group of line switches, each of said primary master switches automatically operated to preselect an idle trunk line in the associated group of trunk lines for use by any primary line switch in the associated group of line switches, a plurality of operator positions, a plurality of links at each of said positions, means responsive to a call on a primary line switch for operating said primary line switch to select the preselected trunk line in the associated group of trunk lines, means controlled over said selected trunk line for seizing an idle link at one of said positions and for artificially marking all of the links busy at said one position, a call storage unit common to said primary master switches, means controlled responsive to the marking busy of all of said links at each of said operator positions for registering said all links busy condition in said storage unit, all links busy relays in said storage unit individual corresponding to each of said primary master switches operated in response to said all links busy registration for preventing the associated primary master switches from operating to preselect idle trunk lines and for preventing primary line switches having calls thereon from selecting said trunk lines, a group of storage trunk lines, a storage plunger line switch in said storage unit for each group of said primary line switches rendered operative in response to said operation of said all links busy relays, a storage master switch common to said storage line switches automatically operated to preselect said storage trunk lines in a predetermined order, means in each of said storage plunger line switches operated in response to call on a primary line switch in the associated group to select said storage trunk line preselected by said storage master switch in order to store at least one call on a primary line switch in each group of primary line switches in the order that said calls are received, a sequence selecting switch having access to said storage trunk lines, means controlled responsive to the removal of said all links busy marking registration for operating said selecting switch to select said storage trunk lines one after another to release the storage line switches connected thereto in the same order that said storage trunk lines are selected by said storage line switches, and means controlled by said release of said storage line switches for operating the associated primary master switches and the primary line switch in each of the associated groups of primary line switches having calls stored thereon to route said stored calls in the same order that they are stored by way of preselected trunk lines to idle links at said operator positions.

18. In a telephone system, a plurality of groups of primary plunger line switches, incoming lines terminating respectively in each of said primary line switches, a plurality of groups of trunk lines, said groups of trunk lines corresponding respectively to said groups of primary line switches and each of the trunk lines in each of said groups of trunk lines being accessible to each of the primary line switches in the associated group of primary line switches, a primary master switch for each group of primary line switches automatically operated to preselect an idle one of said trunk lines in the associated group of trunk lines for use by any primary line switch in the associated group of primary line switches, a call storage unit common to said primary master switches operated responsive to an all trunks busy condition in each of said groups of trunk lines to store a call received thereafter by a primary line switch in each of said groups of primary line switches, means controlled in response to call received by a primary line switch in each of said groups of primary line switches over the associated incoming line for controlling said call storage unit to store said calls, whereby at least one call on a primary line switch in each of said groups of primary line switches may be stored in said storage unit, a storage plunger line switch in said storage unit individual to each of said primary master switches operated to store a call received over an incoming line by a primary line switch in the group served by the associated primary master switch, means in said storage unit controlled in response to the removal of said all trunks busy condition from each of said groups of trunk lines for releasing said operated storage line switches and for simultaneously controlling the associated primary master switches in a predetermined order one at a time to preselect an idle one of said trunk lines in the associated group of trunk lines, and means controlled by said primary master switches for operating the primary line switch in the associated group of line switches to select the trunk line in the associated group of trunk lines preselected by the associated primary master switch, thereby to extend said stored calls received over said incoming lines by way of the associated primary line switches to the preselected trunk lines in the associated groups of trunk lines in the same order that they are stored.

19. In a telephone system, a plurality of groups of primary plunger line switches, incoming lines terminating respectively in each of said primary line switches, a plurality of groups of trunk lines, said groups of trunk lines corresponding respectively to said groups of primary line switches and each of the trunk lines in each of said groups of trunk lines being accessible to each of the primary line switches in the associated group of primary line switches, a primary master switch for each group of primary line switches automatically operated to preselect an idle one of said trunk lines in the associated group of trunk lines for use by any primary line switch in the associated group of primary line switches, a call storage unit common to said primary master switches operated responsive to an all trunks busy condition in each of said groups of trunk lines to store a call received thereafter by a primary line switch in each of said groups of primary line switches, means controlled in response to call received by a primary line switch in each of said groups of primary line switches over the associated incoming line for controlling said call storage unit to store said calls, whereby at least one call on a primary line switch in each of said groups of primary line switches may be stored in said storage unit, a storage plunger line switch in said storage unit individual to each of said primary master switches operated to store a call received over an incoming line by a primary line switch in the group served by the associated primary master switch, a group of storage trunks, a storage master switch common to said storage line switches automatically operated to preselect said storage trunks in a predetermined order, a sequence selecting switch terminating said storage trunks, means controlled responsive to the storage of a call in one of said storage line switches for selecting one of said preselected storage trunks and for simultaneously operating said storage master switch to preselect another storage trunk for use by another storage line switch so that said calls stored on said storage line switches are stored on said storage trunks in the order that they are received, means controlled incident to removal of said all links busy condition for operating said sequence selecting switch to select said storage trunks in a predetermined order, and means controlled responsive to said selection of said storage trunks for releasing said storage line switches connected thereto in the same order that they are operated to store calls and for simultaneously operating the corresponding primary master switch to preselect an idle one of said trunk lines and for operating the primary line switch in the associated group having a stored call to select said preselected trunk line in order to route said stored calls in the same order that they are stored in said preselected trunk line one after another.

20. In a telephone system, two groups of primary line switches, two groups of trunk lines accessible respectively to said two groups of primary line switches, a primary master switch for each group of primary line switches, each of said primary master switches independently operated to preselect an idle trunk line in the associated group of trunk lines for use by any primary line switch in the associated group of primary line switches, a plurality of operator positions, a plurality of links at each of said positions, a call storage unit common to said primary master switches operated responsive to an all links busy condition at each of said operator positions, an all links busy relay in said call storage unit individual to each of said primary master switches controlled in response to said operation of said call storage unit for simultaneously preventing said primary master switches from operating to preselect idle trunk lines, a control relay in said storage unit for each group of primary line switches independently operated in response to a call on a primary line switch in the associated group for preventing said primary line switch from selecting a trunk line, a storage line switch individually associated with each of said control relays, means controlled responsive to said operation of said control relay for operating the associated storage line switch to store said call, whereby at least one call received on a primary line switch in each of said groups of primary line switches may be independently stored by a storage line switch in said storage unit, a sequence selecting switch in said storage unit for selecting said storage line switches one after another, means controlled responsive to the removal of said all links busy condition at each of said operator positions for initiating operation of said sequence selecting switch, means controlled in response to said selection of each of said storage line switches by said sequence selecting switch for restoring the associated all links busy relay and for controlling the associated primary master switch to preselect an idle trunk line in the associated group of trunk lines and for restoring the associated control relay to control operation of the primary line switch in the associated group of primary line switches having said stored call thereon to select said preselected trunk line in the associated group of trunk lines, and means controlled over said selected trunk lines for extending one of said stored calls to an idle link at one of said operator positions to be answered and for extending the other of said stored calls to an idle link at another of said operator positions to be answered.

21. In a telephone system, a plurality of groups of primary line switches, a corresponding plurality of groups of trunk lines accessible respectively to said groups of primary line switches, a primary master switch for each group of primary line switches, each of said primary master switches independently operated to preselect an idle trunk line in the associated group of trunk lines for use by any primary line switch in the associated group of primary line switches, a plurality of operator positions, a plurality of links at each of said positions, a call storage unit common to said primary master switches operated in response to a simultaneous all links busy condition at said operator positions, an all links busy relay in said storage unit individual to each of said primary master switches operated in response to said operation of said call storage unit for simultaneously preventing said primary master switches from operating to preselect idle trunk lines and for conditioning said call storage unit to store at least one call received on a line switch in each group of line switches, a plurality of control relays in said storage unit corresponding respectively to said plurality of primary master switches, a storage line switch individually associated with each of said control relays, means controlled in response to a call on a primary line switch in each of said groups of primary line switches for operating the said control relays corresponding to the associated primary master switches, means controlled responsive to said operation of said control relays for operating the associated storage line switches to store said calls one at a time in the order received by said primary line switch groups, storage trunk lines in said storage unit selected one after another in a predetermined order incident to said operation of said storage line switches, a sequence selecting switch controlled in response to the removal of said all links busy condition at one or more of said operator positions for selecting said storage trunk lines in sequence to restore said all links busy relays in the same order that they are operated, contacts controlled responsive to said restoration of said all links busy relays for controlling the associated primary master switches to preselect idle trunk lines and for restoring the associated control relays in the same order that they are operated and for operating the primary line switches in the groups associated with said primary master switches to select the preselected trunk lines, means controlled by said restoration of said control for restoring the associated storage line switch in order to disconnect the same from said storage trunk line selected by said sequence selecting switch, and means controlled responsive to the selection by said primary line switches of said preselected trunk lines for extending said stored calls to idle links at said operator positions to be answered in the same order of restoration of said all links busy relays.

22. In a telephone system, an operator position, a plurality of links at said position, a storage unit, a plurality of switches having access to said links and to said storage unit, a plurality of lines terminating respectively in said switches, means controlled by the presence of a call on any one of said lines for operating the associated switch to select one of said links when said operator position is idle, means controlled by the presence of a call on any one of said lines for operating the associated switch to select said storage unit when said operator position is busy, and means for reoperating said last-mentioned switch to route the call on the line thereof and stored in said storage unit to one of said links when said operator position becomes idle.

23. In a telephone system, a plurality of operator positions, a plurality of links at each of said positions, a storage unit, a plurality of switches having access to said links and to said storage unit, a line terminating in each of said switches, means controlled by the presence of a call on any one of said lines for initiating operation of the associated switch, means controlled incident to said switch finding an idle one of said links for arresting operation of said switch, thereby to extend a call on said one line to said idle link at one of said operator positions, means at said one operator position for answering said call on said one line and for marking busy all of said links at said position, means in said storage unit controlled in response to an all links busy marking at each of said positions for initiating operation of said storage unit to store subsequent calls on said lines, means controlled by the presence of additional calls on said lines for initiating operation of the associated switches, and means controlled by said storage unit for arresting operation of said switches one after the other incident to said switches finding said storage unit in order to store the calls thereon in a predetermined order in said storage unit.

24. In a telephone system, an operator position, a plurality of links at said position, a common storage unit having a plurality of call storage settings, a plurality of switches having access to said links and to the different settings of said storage unit, means responsive to the presence of a call on any one of said switches normally operating the associated switch to select an idle one of said links in order to route the call to said operator position, means at said operator position for answering a call on any one of said links and for marking busy said links thereat and for controlling said storage unit to condition the first setting thereof to store a subsequent call, means controlled responsive to the presence of a subsequent call on any one of said switches for operating the associated switch to select said first call storage setting to store said call in said storage unit and for conditioning the second setting thereof to store the next call received at a time all of said links are busy, whereby calls are stored in the order received in accordance with the different call storage settings of said call storage unit, means controlled responsive to the removal of said busy marking from one or more of said links for controlling said call storage unit to release said stored call from said first call storage setting and for operating the associated switch in said normal manner to route said stored call to an idle link at said operator position, and means for moving each of said remaining stored calls up one call storage setting.

25. In a telephone system, an operator position, a plurality of links at said position, a common storage unit having a plurality of call storage settings, a plurality of switches having access to said links and to the different settings of said storage unit, means responsive to the presence of a call on any one of said switches normally operating the associated switch to select an idle one of said links in order to route the call to said operator position, means at said operator position for answering a call on any one of said links and for marking busy said links thereat and for controlling said storage unit to condition the first setting thereof to store a subsequent call, means controlled responsive to the presence of a subsequent call on any one of said switches for operating the associated switch to select said first call storage setting to store said call in said storage unit and for conditioning the second setting thereof to store the next call received at a time all of said links are busy, whereby calls are stored in the order received in accordance with the different call storage settings of said call storage unit, means at said operator position for rendering certain of said links thereat idle and for controlling said storage unit to release said switch from said first call storage setting and for operating said switch in said normal manner to route the call thereon by way of one of the idle links to said operator positions to be answered, whereby said links are again marked busy and said first call storage setting of said storage unit is again conditioned to store another call, and means in said call storage unit controlled by said reconditioning of said first storage setting for controlling said switches storing calls in the remaining call storage settings to automatically advance one storage setting.

26. In a telephone system, an operator position, a plurality of links at said position, a storage unit, a plurality of switches, each of said switches including a first set of wipers having access to said links and a second set of wipers having access to said storage unit, a plurality of lines terminating respectively in said switches, means controlled by the presence of a call on any one of said lines for operating the associated switch to select one of said links by way of its first set of wipers when said operator position is idle, means controlled by the presence of a call on any one of said lines for operating the associated switch to select said storage unit by way of its second set of wipers when said operator position is busy, and means for reoperating said last-mentioned switch to disconnect its second set of wipers from said storage unit and to connect its first set of wipers to one of said links when said busy operator position against becomes idle in order to route said call stored in said storage unit to a link at said operator position.

27. In a telephone system, a plurality of operator positions, a plurality of links at each of said positions, a storage unit, a plurality of switches, each of said switches including a first set of wipers having access to said links and a second set of wipers having access to said storage unit, a line terminating in each of said switches, means controlled by the presence of a call on any one of said lines for initiating operation of the sets of wipers of the associated switch, means controlled incident to said first set of wipers of said switch finding an idle one of said links for arresting operation of said sets of wipers of said switch, thereby to extend a call on said one line to said idle link at one of said operator positions by way of said first set of wipers of said switch, means at said one operator position for answering said call on said one line and for marking busy all of said links at said position, means in said storage unit controlled in response to an all links busy marking at each of said positions for initiating operation of said storage unit to store subsequent calls on said lines, means controlled by the presence of additional calls on said lines for initiating operation of the sets of wipers of the associated switches, and means controlled by said storage unit incident to said second sets of wipers of said switches finding said storage unit for arresting operation of said wiper sets of said switches one after another in order to store the calls thereon in a predetermined order in said storage unit.

28. In a telephone system, an operator position, a plurality of links at said position, a common storage unit having a plurality of call storage settings, a plurality of switches, each of said switches including a first set of wipers having access to said links and a second set of wipers having access to the different settings of said storage unit, means responsive to the presence of a call on any one of said switches normally operating the sets of wipers of the associated switch to select an idle one of said links by way of the first set of wipers thereof to route the call to said operator position, means at said operator position for answering a call on any one of said links and for marking busy said links thereat and for controlling said storage unit to condition the first setting thereof to store a subsequent call, means controlled responsive to the presence of a subsequent call on any one of said switches for operating the sets of wipers of the associated switch to select said first call storage setting by way of the second set of wipers thereof to store said call in said storage unit and for conditioning the second setting thereof to store the next call received at a time all of said links are busy, whereby calls are stored in the order received in accordance with the different call storage settings of said call storage unit, means controlled responsive to the removal of said busy marking from one or more of said links for controlling said call storage unit to release said stored call from said first call storage setting and for operating the sets of wipers of the associated switch in said normal manner to route said stored call to an idle link at said operator position by way of said first set of wipers, and means for operating the wiper sets of the remaining switches having calls stored in said storage unit to advance the second sets of wipers of such switches at least one call storage setting.

29. In a telephone system, an operator position, a plurality of links at said position, a common storage unit having a plurality of call storage settings, a plurality of switches, each of said switches including a first set of wipers having access to said links and a second set of wipers having access to the different settings of said storage unit, means responsive to the presence of a call on any one of said switches normally operating the sets of wipers of the associated switch to select an idle one of said links by way of the first set of wipers thereof to route the call to said operator position, means at said operator position for answering a call on any one of said links and for marking busy said links thereat and for controlling said storage unit to condition the first setting thereof to store a subsequent call, means controlled responsive to the presence of a subsequent call on any one of said switches for operating the sets of wipers of the associated switch to select said first call storage setting by way of the second set of wipers thereof to store said call in said storage unit and for conditioning the second setting thereof to store the next call received at a time all of said links are busy, whereby calls are stored in the order received in accordance with the different call storage settings of said call storage unit, means at said operator position for rendering certain of said links thereat idle and for controlling said storage unit to release said second set of wipers of said switch from said first call storage setting and for operating said first set of wipers of said switch in said normal manner to route the call thereon by way of one of the idle links to said operator positions to be answered, whereby said links are again marked busy and said first call storage setting of said storage unit is again conditioned to store another call, and means in said call storage unit controlled by said reconditioning of said first storage setting for controlling said second sets of wipers of said switches storing calls in the remaining call storage settings to automatically advance one storage setting.

30. In a telephone system, a plunger line switch, an incoming line terminating in said line switch, a plurality of trunk lines accessible to said plunger line switch, a master switch operated to preselect an idle one of said trunk lines for use by said plunger line switch, said incoming line and each of said trunk lines including a pair of line conductors and a control conductor and an extra control conductor, a line relay in said line switch connected to said extra control conductor of said incoming line and operated thereover, control means in said line switch operated in response to said operation of said line relay for operating said line switch to select said preselected trunk line and for interconnecting the said conductors of said incoming line with the corresponding conductors of said selected trunk line, additional means controlled by said control means for disconnecting said line relay from said extra control conductor and for locking said control means to said control conductor of said selected trunk line, and means in said master switch automatically governed in response to said selection by said line switch of said preselected trunk line for preselecting another idle trunk line for use by another line switch.

31. In a telephone system, a plunger line switch, an incoming line terminating in said line switch, a plurality of trunk lines accessible to said plunger line switch, a master switch operated to preselect an idle one of said trunk lines for use by said plunger line switch, said incoming line and each of said trunk lines including a pair of line conductors and a control conductor and an extra control conductor, a line relay in said line switch connected to said extra control conductor of said incoming line and operated thereover, a control relay in said line switch operated in response to said operation of said line relay for operating said line switch to select said preselected trunk line and interconnect the said conductors of said incoming line with the corresponding conductors of said selected trunk line, contact means controlled by said control relay for disconnecting said line relay from said extra control conductor and for locking said control relay to said control conductor of said selected trunk line, and means in said master switch automatically controlled over said control conductor of said selected trunk line in response to said selection thereof by said line switch for preselecting another idle trunk line for use by another line switch.

References Cited in the file of this patent

UNITED STATES PATENTS

| | | |
|---|---|---|
| 2,249,449 | Wicks | July 15, 1941 |
| 2,249,459 | Crocker | July 15, 1941 |
| 2,249,475 | Kessler | July 15, 1941 |

FOREIGN PATENTS

"Telephony," Atkinson, vol. II, pp. 707–711, 1948.
"Telephony," Atkinson, vol. II, pp. 720–723, 1948.